US011533672B2

(12) United States Patent
Abedini et al.

(10) Patent No.: US 11,533,672 B2
(45) Date of Patent: Dec. 20, 2022

(54) HOP-COUNT INDICATION IN WIRELESS SYSTEMS

(71) Applicant: QUALCOMM Incorporated, San Diego, CA (US)

(72) Inventors: Navid Abedini, Somerset, NJ (US); Tao Luo, San Diego, CA (US); Karl Georg Hampel, Hoboken, NJ (US); Jianghong Luo, Skillman, NJ (US); Muhammad Nazmul Islam, Littleton, MA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 16/537,266

(22) Filed: Aug. 9, 2019

(65) Prior Publication Data
US 2020/0053625 A1 Feb. 13, 2020

Related U.S. Application Data

(60) Provisional application No. 62/718,289, filed on Aug. 13, 2018.

(51) Int. Cl.
*H04W 40/22* (2009.01)
*H04L 45/00* (2022.01)
(Continued)

(52) U.S. Cl.
CPC ........... *H04W 40/22* (2013.01); *H04L 45/122* (2013.01); *H04L 45/20* (2013.01); *H04W 40/12* (2013.01);
(Continued)

(58) Field of Classification Search
None
See application file for complete search history.

(56) References Cited

U.S. PATENT DOCUMENTS

2002/0173310 A1 11/2002 Ebata et al.
2005/0154790 A1* 7/2005 Nagata ................. H04L 41/145
709/223
(Continued)

FOREIGN PATENT DOCUMENTS

WO WO-2015143170 A1 9/2015
WO WO-2016073084 A1 5/2016

OTHER PUBLICATIONS

International Search Report and Written Opinion—PCT/US2019/046212—ISA/EPO—dated Feb. 24, 2020.
(Continued)

*Primary Examiner* — Hassan A Phillips
*Assistant Examiner* — Gautam Sharma
(74) *Attorney, Agent, or Firm* — Arent Fox LLP/Qualcomm Incorporated

(57) ABSTRACT

Methods, systems, and devices for wireless communications are described that provide for hop-count indication in an integrated access and backhaul (IAB) network. An IAB-node may adopt and indicate multiple values for hop-count. The hop-count may be conveyed by a number of different reference signals and channels. A resource pattern and/or a slot pattern may also be associated with the hop-count to simply signaling. By associating the patterns with the hop-count, an IAB-node may be able to infer the resource pattern used by another IAB-node.

26 Claims, 20 Drawing Sheets

(51) Int. Cl.
*H04W 72/04* (2009.01)
*H04W 40/12* (2009.01)
*H04L 45/122* (2022.01)
*H04W 56/00* (2009.01)
*H04W 88/08* (2009.01)

(52) U.S. Cl.
CPC ..... *H04W 56/0025* (2013.01); *H04W 72/042* (2013.01); *H04W 72/044* (2013.01); *H04W 88/08* (2013.01)

(56) References Cited

U.S. PATENT DOCUMENTS

| | | | |
|---|---|---|---|
| 2009/0181693 A1* | 7/2009 | So | H04L 45/125 455/453 |
| 2012/0176927 A1 | 7/2012 | Takano | |
| 2013/0195005 A1 | 8/2013 | Al-Shalash | |
| 2013/0286819 A1 | 10/2013 | Kim et al. | |
| 2014/0198708 A1* | 7/2014 | Lee | H04W 76/14 370/312 |
| 2015/0036540 A1 | 2/2015 | Kasslin et al. | |
| 2015/0327204 A1* | 11/2015 | Park | H04W 56/0015 370/350 |
| 2016/0095074 A1 | 3/2016 | Park et al. | |
| 2016/0119739 A1* | 4/2016 | Hampel | H04W 4/38 370/315 |
| 2016/0135107 A1 | 5/2016 | Hampel et al. | |
| 2016/0338099 A1* | 11/2016 | Serizawa | H04W 74/04 |
| 2017/0034799 A1* | 2/2017 | Kim | H04W 56/003 |
| 2017/0086125 A1* | 3/2017 | Seo | H04W 76/14 |
| 2017/0142741 A1 | 5/2017 | Kaur et al. | |
| 2017/0150527 A1* | 5/2017 | Duval | H04W 74/0816 |
| 2018/0063771 A1 | 3/2018 | Singh et al. | |
| 2018/0152377 A1* | 5/2018 | Wetterwald | H04W 40/04 |
| 2019/0268335 A1* | 8/2019 | Targali | H04L 9/3236 |
| 2020/0053625 A1 | 2/2020 | Abedini et al. | |
| 2020/0053626 A1 | 2/2020 | Abedini et al. | |
| 2020/0053680 A1 | 2/2020 | Abedini et al. | |
| 2021/0143959 A1* | 5/2021 | Xu | H04L 27/261 |

OTHER PUBLICATIONS

Sirotkin S., "LTE-WLAN Aggregation (LWA): Benefits and Deployment Considerations", Intel Corp., pp. 1-22, 2016.

Partial International Search Report—PCT/US2019/046212—ISA/EPO—dated Nov. 19, 2019.

TCL Communication: "QoS and route selection for IAB", 3GPP Draft; R2-1810114, 3rd Generation Partnership Project (3GPP), Mobile Competence Centre; 650, Route Des Lucioles; F-06921, Sophia-Antipolis Cedex; France, vol. RAN WG2, No. Montreal, Canada; Jul. 2, 2018-Jul. 6, 2018, Jul. 1, 2018 (Jul. 1, 2018), pp. 1-2, XP051467327, Retrieved from the Internet: URL:http://www.3gpp.org/ftp/Meetings%5F3GPP%5FSYNC/RAN2/Docs.

* cited by examiner

HOP-COUNT INDICATION IN WIRELESS SYSTEMS

CROSS REFERENCE

The present application for patent claims the benefit of U.S. Provisional Patent Application No. 62/718,289 by ABEDINI et al., entitled "HOP-COUNT INDICATION IN WIRELESS SYSTEMS," filed Aug. 13, 2018, assigned to the assignee hereof, and expressly incorporated herein.

FIELD OF TECHNOLOGY

The following relates generally to wireless communications, and more specifically to hop-count indication in wireless systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-orthogonal frequency division multiplexing (DFT-S-OFDM). A wireless multiple-access communications system may include a number of base stations or network access nodes (ANs), each simultaneously supporting communication for multiple communication devices, which may be otherwise known as user equipment (UE).

Some wireless communications systems, such as those operating in a millimeter wave (mmW) spectrum, may include ANs to facilitate wireless communication between a UE and the network. In some cases, an anchor AN may have a high-capacity, wired, backhaul connection (e.g., fiber) to the network, while communicating simultaneously with one or more ANs (e.g., relay devices) or UEs (which may include relay functionality in some instances). A network that supports communications between an AN and a UE may be referred to as an access network, while a network that supports communications between one or more ANs may be referred to as a backhaul network. In deployments supporting both access and backhaul (e.g., in an Integrated Access and Backhaul (IAB) network), resource allocation may be complex due to the considerations taken into account when scheduling resources. In some cases, multiple ANs may share the same physical cell identifiers (PCIDs), which may complicate the signaling in wireless communications systems.

SUMMARY

The described techniques relate to improved methods, systems, devices, and apparatuses that support hop-count indication in wireless systems. Generally, the described techniques provide for hop-indication in wireless systems in an Integrated Access and Backhaul (IAB) network. In some cases, access nodes (ANs) may share the same physical cell identifiers (PCIDs) which may complicate signaling and lead to resource allocation issues in wireless communications systems. To reduce ambiguity, an AN may adopt and indicate one or more values for a hop-count between the AN and another node (e.g., another AN, an anchor AN) in the IAB network. For example, the hop-count may be conveyed via a channel state information reference signal (CSI-RS), or it may be used in the scrambling sequence of a data channel and/or a control channel. Based on the hop-count, an access device (e.g., a user equipment (UE)), or other AN may identify resource allocation schemes or communication paths suitable for transmission and reception of data.

A method for wireless communications at a relay network node in a wireless communications system is described. The method may include identifying a hop-count between the relay network node and a network node in the wireless communications system, selecting a set of time-frequency resources for transmission of a signal to a second network node in the wireless communications system, generating the signal based on a generation sequence, where the signal conveys an indication of the hop-count and the indication of the hop-count is based on the set of time-frequency resources or the generation sequence, and transmitting the signal over the set of time-frequency resources to the second network node.

An apparatus for wireless communications at a relay network node in a wireless communications system is described. The apparatus may include a processor, memory in electronic communication with the processor, and instructions stored in the memory. The instructions may be executable by the processor to cause the apparatus to identify a hop-count between the relay network node and a network node in the wireless communications system, select a set of time-frequency resources for transmission of a signal to a second network node in the wireless communications system, generate the signal based on a generation sequence, where the signal conveys an indication of the hop-count and the indication of the hop-count is based on the set of time-frequency resources or the generation sequence, and transmit the signal over the set of time-frequency resources to the second network node.

Another apparatus for wireless communications at a relay network node in a wireless communications system is described. The apparatus may include means for identifying a hop-count between the relay network node and a network node in the wireless communications system, selecting a set of time-frequency resources for transmission of a signal to a second network node in the wireless communications system, generating the signal based on a generation sequence, where the signal conveys an indication of the hop-count and the indication of the hop-count is based on the set of time-frequency resources or the generation sequence, and transmitting the signal over the set of time-frequency resources to the second network node.

A non-transitory computer-readable medium storing code for wireless communications at a relay network node in a wireless communications system is described. The code may include instructions executable by a processor to identify a hop-count between the relay network node and a network node in the wireless communications system, select a set of time-frequency resources for transmission of a signal to a second network node in the wireless communications system, generate the signal based on a generation sequence, where the signal conveys an indication of the hop-count and the indication of the hop-count is based on the set of time-frequency resources or the generation sequence, and transmit the signal over the set of time-frequency resources to the second network node.

In some examples of the method, apparatuses, and non-transitory computer-readable medium described herein, generating the signal may include operations, features, means, or instructions for generating a CSI-RS, a tracking reference signal (TRS), a sounding reference signal (SRS), a control channel, a data channel, or a demodulation reference signal (DMRS) associated with the control channel or the data channel based on the set of time-frequency resources, where the set of time-frequency resources conveys the indication of the hop-count.

Some examples of the method, apparatuses, and non-transitory computer-readable medium described herein may further include operations, features, means, or instructions for generating a DMRS sequence associated with a control channel or a data channel, where the DMRS sequence conveys the indication of the hop-count.

In some examples of the method, apparatuses, and non-transitory computer-readable medium described herein, generating the signal may include operations, features, means, or instructions for generating a CSI-RS, a TRS, an SRS, a control channel, or a data channel based on the generation sequence, where the generation sequence conveys the indication of the hop-count.

In some examples of the method, apparatuses, and non-transitory computer-readable medium described herein, the generation sequence may be a scrambling sequence or a base sequence.

Some examples of the method, apparatuses, and non-transitory computer-readable medium described herein may further include operations, features, means, or instructions for determining that one or more nodes of the wireless communications system shared a cell identifier (ID) with the relay network node and generating a second ID based on the cell ID and the hop-count, where the second ID may be used as the generation sequence for generating the signal.

In some examples of the method, apparatuses, and non-transitory computer-readable medium described herein, the second ID may be generated based on a sibling count or a random value.

Some examples of the method, apparatuses, and non-transitory computer-readable medium described herein may further include operations, features, means, or instructions for determining, based on the hop-count, a resource pattern or a slot structure for the relay network node, a parent network node in communication with the relay network node, a child network node in communication with the relay network node, an access device in communication with the relay network node, or any combination thereof.

In some examples of the method, apparatuses, and non-transitory computer-readable medium described herein, the resource pattern or the slot structure may be determined based on a mapping rule.

In some examples of the method, apparatuses, and non-transitory computer-readable medium described herein, the resource pattern or the slot structure may be associated with a semi-static resource allocation.

Some examples of the method, apparatuses, and non-transitory computer-readable medium described herein may further include operations, features, means, or instructions for indicating the hop-count via a second signal different from the signal.

In some examples of the method, apparatuses, and non-transitory computer-readable medium described herein, the second signal includes a system information block (SIB).

In some examples of the method, apparatuses, and non-transitory computer-readable medium described herein, the network node may be an anchor network node.

A method of wireless communications at a node in a wireless communications system is described. The method may include receiving a signal from a relay network node in the wireless communications system, determining a hop-count between the relay network node and a second network node in the wireless communications system based on the received signal, and communicating with the relay network node based on the hop-count.

An apparatus for wireless communications at a node in a wireless communications system is described. The apparatus may include a processor, memory in electronic communication with the processor, and instructions stored in the memory. The instructions may be executable by the processor to cause the apparatus to receive a signal from a relay network node in the wireless communications system, determine a hop-count between the relay network node and a second network node in the wireless communications system based on the received signal, and communicate with the relay network node based on the hop-count.

Another apparatus for wireless communications at a node in a wireless communications system is described. The apparatus may include means for receiving a signal from a relay network node in the wireless communications system, determining a hop-count between the relay network node and a second network node in the wireless communications system based on the received signal, and communicating with the relay network node based on the hop-count.

A non-transitory computer-readable medium storing code for wireless communications at a node in a wireless communications system is described. The code may include instructions executable by a processor to receive a signal from a relay network node in the wireless communications system, determine a hop-count between the relay network node and a second network node in the wireless communications system based on the received signal, and communicate with the relay network node based on the hop-count.

Some examples of the method, apparatuses, and non-transitory computer-readable medium described herein may further include operations, features, means, or instructions for receiving, over a set of time-frequency resources, at least one of a CSI-RS, a TRS, an SRS, a control channel, a data channel, or a DMRS associated with the control channel or the data channel and determining the hop-count based on the set of time-frequency resources.

In some examples of the method, apparatuses, and non-transitory computer-readable medium described herein, the set of time-frequency resources conveys an indication of the hop-count.

Some examples of the method, apparatuses, and non-transitory computer-readable medium described herein may further include operations, features, means, or instructions for receiving a DMRS sequence associated with a control channel or a data channel and determining the hop-count based on the DMRS sequence.

In some examples of the method, apparatuses, and non-transitory computer-readable medium described herein, the DMRS sequence conveys an indication of the hop-count.

Some examples of the method, apparatuses, and non-transitory computer-readable medium described herein may further include operations, features, means, or instructions for receiving at least one of a CSI-RS, a TRS, an SRS, a control channel, or a data channel associated with a generation sequence and determining the hop-count based on the generation sequence.

In some examples of the method, apparatuses, and non-transitory computer-readable medium described herein, the generation sequence includes a scrambling sequence or a base sequence and the generation sequence conveys an indication of the hop-count.

Some examples of the method, apparatuses, and non-transitory computer-readable medium described herein may further include operations, features, means, or instructions for determining a resource pattern or a slot structure for communication with the relay network node based on the hop-count, where the resource pattern or the slot structure may be determined based on a mapping rule.

Some examples of the method, apparatuses, and non-transitory computer-readable medium described herein may further include operations, features, means, or instructions for communicating with the relay network node based on the resource pattern, the slot structure, or a combination thereof.

In some examples of the method, apparatuses, and non-transitory computer-readable medium described herein, the resource pattern or the slot structure may be associated with a semi-static resource allocation.

In some examples of the method, apparatuses, and non-transitory computer-readable medium described herein, the signal may be a broadcast signal and a set of time-frequency resources associated with the signal or a periodicity of the signal may indicate the hop-count.

In some examples of the method, apparatuses, and non-transitory computer-readable medium described herein, receiving the signal may include operations, features, means, or instructions for receiving a common channel carrying information related to multiple hop-counts and determining the hop-count for communication with the relay network node based on the common channel.

A method of wireless communications at a relay network node in a wireless communications system is described. The method may include identifying a first communication path from the relay network node to a first anchor network node of the wireless communications system, where the first communication path is associated with a first hop-count and a first quality of service (QoS), identifying a second communication path from the relay network node to a second anchor network node of the wireless communications system, where the second communication path is associated with a second hop-count and a second QoS, and indicating at least one of the first hop-count or the second hop-count to a child network node or an access device in communication with the relay network node.

An apparatus for wireless communications at a relay network node in a wireless communications system is described. The apparatus may include a processor, memory in electronic communication with the processor, and instructions stored in the memory. The instructions may be executable by the processor to cause the apparatus to identify a first communication path from the relay network node to a first anchor network node of the wireless communications system, where the first communication path is associated with a first hop-count and a QoS, identify a second communication path from the relay network node to a second anchor network node of the wireless communications system, where the second communication path is associated with a second hop-count and a second QoS, and indicate at least one of the first hop-count or the second hop-count to a child network node or an access device in communication with the relay network node.

Another apparatus for wireless communications at a relay network node in a wireless communications system is described. The apparatus may include means for identifying a first communication path from the relay network node to a first anchor network node of the wireless communications system, where the first communication path is associated with a first hop-count and a QoS, identifying a second communication path from the relay network node to a second anchor network node of the wireless communications system, where the second communication path is associated with a second hop-count and a second QoS, and indicating at least one of the first hop-count or the second hop-count to a child network node or an access device in communication with the relay network node.

A non-transitory computer-readable medium storing code for wireless communications at a relay network node in a wireless communications system is described. The code may include instructions executable by a processor to identify a first communication path from the relay network node to a first anchor network node of the wireless communications system, where the first communication path is associated with a first hop-count and a QoS, identify a second communication path from the relay network node to a second anchor network node of the wireless communications system, where the second communication path is associated with a second hop-count and a second QoS, and indicate at least one of the first hop-count or the second hop-count to a child network node or an access device in communication with the relay network node.

Some examples of the method, apparatuses, and non-transitory computer-readable medium described herein may further include operations, features, means, or instructions for determining the first QoS based on the first hop-count, a network load of one or more network nodes associated with the first communication path, a backhaul link capacity between the one or more network nodes associated with the first communication path, or a stability of the backhaul link between the one or more network nodes associated with the first communication path, or a combination thereof and determining the second QoS based on the second hop-count, the network load of one or more network nodes associated with the second communication path, a backhaul link capacity between the one or more network nodes associated with the second communication path, or a stability of the backhaul link between the one or more network nodes associated with the second communication path, or a combination thereof.

Some examples of the method, apparatuses, and non-transitory computer-readable medium described herein may further include operations, features, means, or instructions for serving the child network node in communication with the relay network node via the first communication path and serving the access device in communication with the relay network node via the second communication path.

Some examples of the method, apparatuses, and non-transitory computer-readable medium described herein may further include operations, features, means, or instructions for determining that new requests cannot be served via the first communication path and indicating the second hop-count to the child network node or the access device.

In some examples of the method, apparatuses, and non-transitory computer-readable medium described herein, indicating the first hop-count may include operations, features, means, or instructions for generating a first signal based on a first generation sequence, where the first signal conveys an indication of the first hop-count and the indication of the first hop-count may be based on a first set of time-frequency resources allocated for the first signal or the first generation sequence.

Some examples of the method, apparatuses, and non-transitory computer-readable medium described herein may further include operations, features, means, or instructions for generating a second signal based on a second generation sequence, where the second signal conveys an indication of the second hop-count and the indication of the second hop-count may be based on a second set of time-frequency resources allocated for the second signal or the second generation sequence.

In some examples of the method, apparatuses, and non-transitory computer-readable medium described herein, the first and second signals may be broadcast signals transmitted over different time-frequency resources or at different periodicities.

Some examples of the method, apparatuses, and non-transitory computer-readable medium described herein may further include operations, features, means, or instructions for generating a common channel carrying information related to the first and second communication paths.

In some examples of the method, apparatuses, and non-transitory computer-readable medium described herein, the information related to the first and second communication paths includes the first and second hop-counts.

In some examples of the method, apparatuses, and non-transitory computer-readable medium described herein, the first hop-count and the second hop-count may be the same.

In some examples of the method, apparatuses, and non-transitory computer-readable medium described herein, the first anchor network node and the second anchor network node may be the same.

A method for wireless communications at a control node in a wireless communications system is described. The method may include determining a resource configuration for a relay network node in the wireless communications system, where the resource configuration is associated with a set of time-frequency resources selectable, based on a hop-count between the relay network node and a network node in the wireless communications system, for communication with the network node, and transmitting the resource configuration to the relay network node.

An apparatus for wireless communications at a control node in a wireless communications system is described. The apparatus may include a processor, memory in electronic communication with the processor, and instructions stored in the memory. The instructions may be executable by the processor to cause the apparatus to determine a resource configuration for a relay network node in the wireless communications system, where the resource configuration is associated with a set of time-frequency resources selectable, based on a hop-count between the relay network node and a network node in the wireless communications system, for communication with the network node, and transmit the resource configuration to the relay network node.

Another apparatus for wireless communications at a control node in a wireless communications system is described. The apparatus may include means for determining a resource configuration for a relay network node in the wireless communications system, where the resource configuration is associated with a set of time-frequency resources selectable, based on a hop-count between the relay network node and a network node in the wireless communications system, for communication with the network node, and transmitting the resource configuration to the relay network node.

A non-transitory computer-readable medium storing code for wireless communications at a control node in a wireless communications system is described. The code may include instructions executable by a processor to determine a resource configuration for a relay network node in the wireless communications system, where the resource configuration is associated with a set of time-frequency resources selectable, based on a hop-count between the relay network node and a network node in the wireless communications system, for communication with the network node, and transmit the resource configuration to the relay network node.

Some examples of the method, apparatuses, and non-transitory computer-readable medium described herein may further include operations, features, means, or instructions for identifying the hop-count between the relay network node and the network node, and selecting the set of time-frequency resources based at least in part on the hop-count.

In some examples of the method, apparatuses, and non-transitory computer-readable medium described herein, the resource configuration is associated with multiple sets of time-frequency resources, and one or more of the multiple sets is selectable by the relay network node based at least in part on the hop-count.

DETAILED DESCRIPTION

In some wireless communications systems, such as those deploying New Radio (NR) technologies, wireless backhaul links may be used to couple an access node (AN) to a network in place of high-capacity, wired backhaul link (e.g., fiber). For example, a first AN (e.g., relay node) in communication with a user equipment (UE), or another AN, may establish a backhaul link (wired or wireless) with a second AN (e.g., anchor), which has a high-capacity, wired backhaul link to the network. In this manner, the first AN may communicate access traffic from the UE (or another AN) to the network via the second AN through a combination of the one or more backhaul links. In some examples, a backhaul network may use multiple backhaul links before reaching a wired backhaul link. The first AN may be referred to as a UE-Function (UEF) with respect to the anchor and an AN Function (ANF) with respect to the UE (or another AN) with which the first AN is communicating. Thus, a relay node may act as a UE for its one or more parent relays (e.g., relays that connect the relay node one hop closer to the anchor) and as a base station for its child relays and/or UEs within its coverage area. In some examples, an wireless node in an integrated access and backhaul (IAB) network may adopt and indicate multiple values for the hop-count.

In some examples, the hop-count may be indicated through any of a channel state information reference signal (CSI-RS), a data channel, a control channel. Additionally or alternatively, the hop-count may be indicated through other types of signaling such as a system information block (SIB) and may also be used in generating a signal including, but not limited to, a CSI-RS, a data channel, and a control channel.

In some cases, multiple IAB-nodes may share the same cell identifier (ID). In such instances, the IAB-nodes may adopt a different ID or a second ID to generate one or more signal that may have been previously generated based on the cell ID. This second ID may be a function of cell ID, hop-count, and other information including, but not limited to, sibling count, or even an arbitrarily chosen value.

Aspects of the disclosure are initially described in the context of wireless communications systems. Aspects of then illustrated and described with reference to a network scheme and process flows. Aspects of the disclosure are further illustrated by and described with reference to apparatus diagrams, system diagrams, and flowcharts that relate to hop-count indication in wireless systems.

Figure 1:
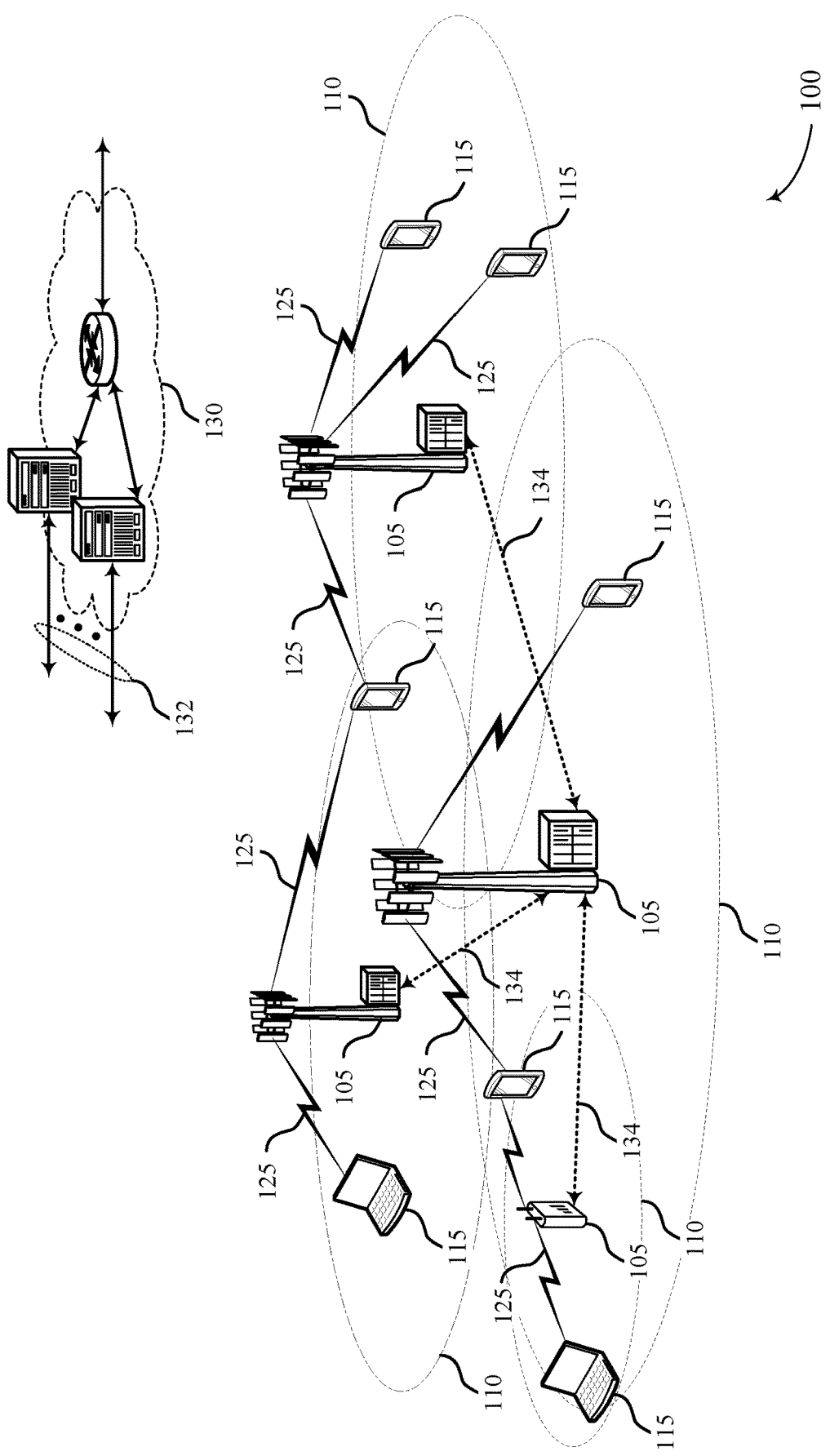
FIG. 1 illustrates an example of a wireless communications system that supports hop-count indication in wireless systems in accordance with aspects of the present disclosure.

FIG. 1 illustrates an example of a wireless communications system 100 that supports hop-count indication in wireless systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an ID for distinguishing neighboring cells (e.g., a physical cell ID (PCID), a virtual cell ID (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an AN controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these.

Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The described techniques provide for hop-indication in wireless systems in an IAB network, which may be supported by wireless communications system 100. In some cases, ANs (e.g., a base station 105 or a UE 115 acting as a relay) may share the same PCIDs, which may complicate signaling in wireless communications system 100. To reduce ambiguity, the ANs may adopt and indicate multiple values for the hop-count. For example, the hop-count may be conveyed via a CSI-RS, or it may be conveyed via the scrambling sequence of a data channel and/or a control channel.

Figure 2:
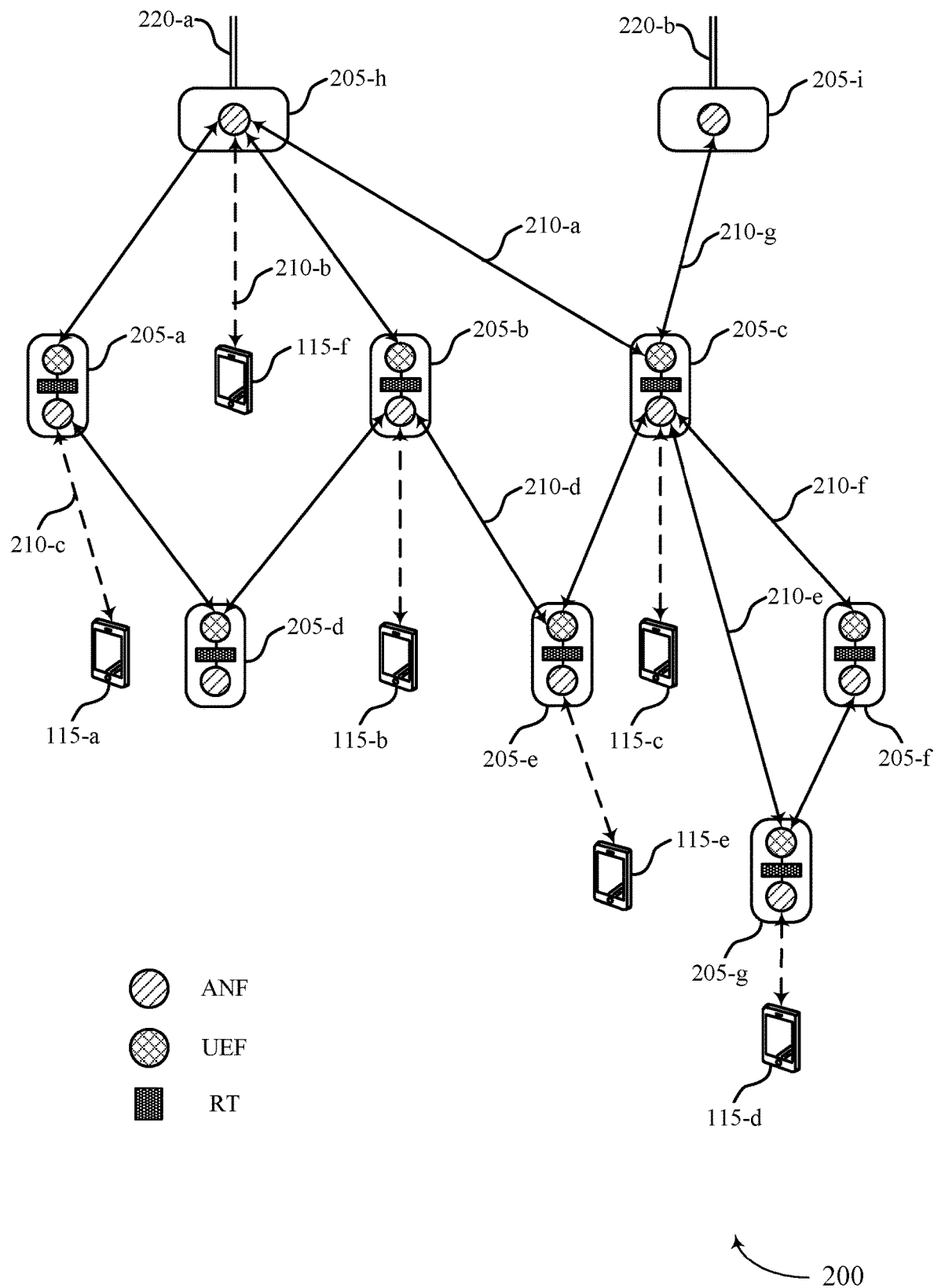
FIG. 2 illustrates an example of a wireless communications system that supports hop-count indication in wireless systems in accordance with aspects of the present disclosure.

FIG. 2 illustrates an example of a wireless communications system 200 that supports hop-count indication in wireless systems in accordance with aspects of the present disclosure. In some examples, wireless communications system 200 may implement aspects of wireless communications system 100.

In some cases, the wireless communications system 200 may be an example of a wireless communications network that operates in mmW spectrum, or supports 5G NR deployments. The wireless communications system 200 may include a number of ANs 205 (ANs 205-a, 205-b, 205-c, etc.) and UEs 115 (UEs 115-a, 115-b, 115-c, etc.) that communicate over a combination of wired links 220 (e.g., wired links 220-a and 220-b) and wireless links 210 (210-a, 210-b, 210-c, etc.). In some cases, the wired links 220 may be core network links, and may connect anchor ANs 205-h and 205-i to the core network (e.g., core network 130 of FIG. 1). The ANs 205 may be examples of the ANs 105 (e.g., relay devices, base stations 105) described in reference to FIG. 1.

In FIG. 2, anchor ANs 205-h and 205-i may also be integrated access backhaul donors (referred to herein as IAB-donors). An IAB-donor may be a radio access network node or RAN-node that terminates a next generation interface (Ng interface) with the core network. ANs 205-a, 205-b, and 205-c may be integrated access backhaul nodes (referred to herein as IAB-nodes). An IAB-node may be a radio access network (RAN)-node that may provide IAB functionality with two roles. The first role of the IAB-node may be an ANF. The ANF may schedule UEs and other IAB-nodes that may be connected to the IAB-nodes as child nodes. The ANF may control both access links and backhaul links under the corresponding coverage of the IAB-node. The second role of the IAB-node may be a UEF which may involve a backhaul link. The UEF may be controlled and scheduled by an IAB-donor or another IAB-node as its parent node. The UEF and the ANF are included in ANs 205-a, 205-b, 205-c, and so forth. The UEF is depicted in the wireless communications system 200 by a cross-hatched pattern and the ANF is depicted in the wireless communications system 200 by a striped pattern.

In the wireless communications system 200, the distance or number of links between an IAB-donor and an IAB-node may be indicated by a hop-count. In one topology of a wireless communications system, there may only be a single path from each of the IAB-nodes to the IAB-donor. In this example, the IAB topology is a spanning tree. In other topologies and as illustrated in the wireless communications system 200, an IAB-node may have multiple paths to one or multiple IAB-donors. In this topology of multiple paths, the hop-count may be defined as the "shortest" distance or fewest links to an IAB-donor.

For example, and as illustrated in FIG. 2, AN 205-d or IAB-node 205-d, has multiple paths to anchor AN 205-h or IAB-donor 205-h and each of the paths has a hop-count of two. The first path for AN 205-d has a first link to AN 205-b and a second link from AN 205-b to anchor AN 205-h. The second path for AN 205-d has a first link to AN 205-a and a second link to anchor AN 205-h. Alternatively, the hop-count may indicate the distance or links to a reference node such as a synchronization source, which may not be an anchor AN 205-h or 205-i.

In some cases, a node of wireless communications system 200 may adopt and indicate one or more values for the hop-count as discussed herein. In one example, the hop-count may be indicated through any of a CSI-RS, a data channel, a control channel. Although indicating the hop-count in these ways may reduce signaling overhead, it may also entail blind detection of hop-count which may be more difficult in dynamic scenarios in which the hop-count may change.

In yet another example, the hop-count may be indicated through other types of signaling such as a SIB. Additionally or alternatively, the hop-count may be used in generating a signal including, but not limited to, a CSI-RS, a data channel, or a control channel.

Further, the hop-count may be indicated by a signal and the indication of the hop-count may be based at least in part on a set of time-frequency resources used for transmission of the signal or a generation sequence used for generating the signal. In this example, a hop-count may be identified between a relay network node and a network node in the wireless communications system 200. The relay network node may be an IAB-donor such as AN 205-*h*, and the network node may be an IAB-node such as AN 205-*b*. As previously discussed, IAB-nodes may be ANs 205 or UEs 115. A set of time-frequency resources may be selected for transmission of a signal to a second network node in the wireless communications system 200. The second network node may be an IAB-node or AN 205-*d*.

Further, the signal generated using a generation sequence that indicates a hop-count may be a CSI-RS, a tracking reference signal (TRS), a sounding reference signal (SRS), a control channel, a data channel, or a demodulation reference signal (DMRS) associated with the control channel or the data channel. In some cases, the set of time-frequency resources used for transmitting the signal conveys the indication of the hop-count.

Figure 3:
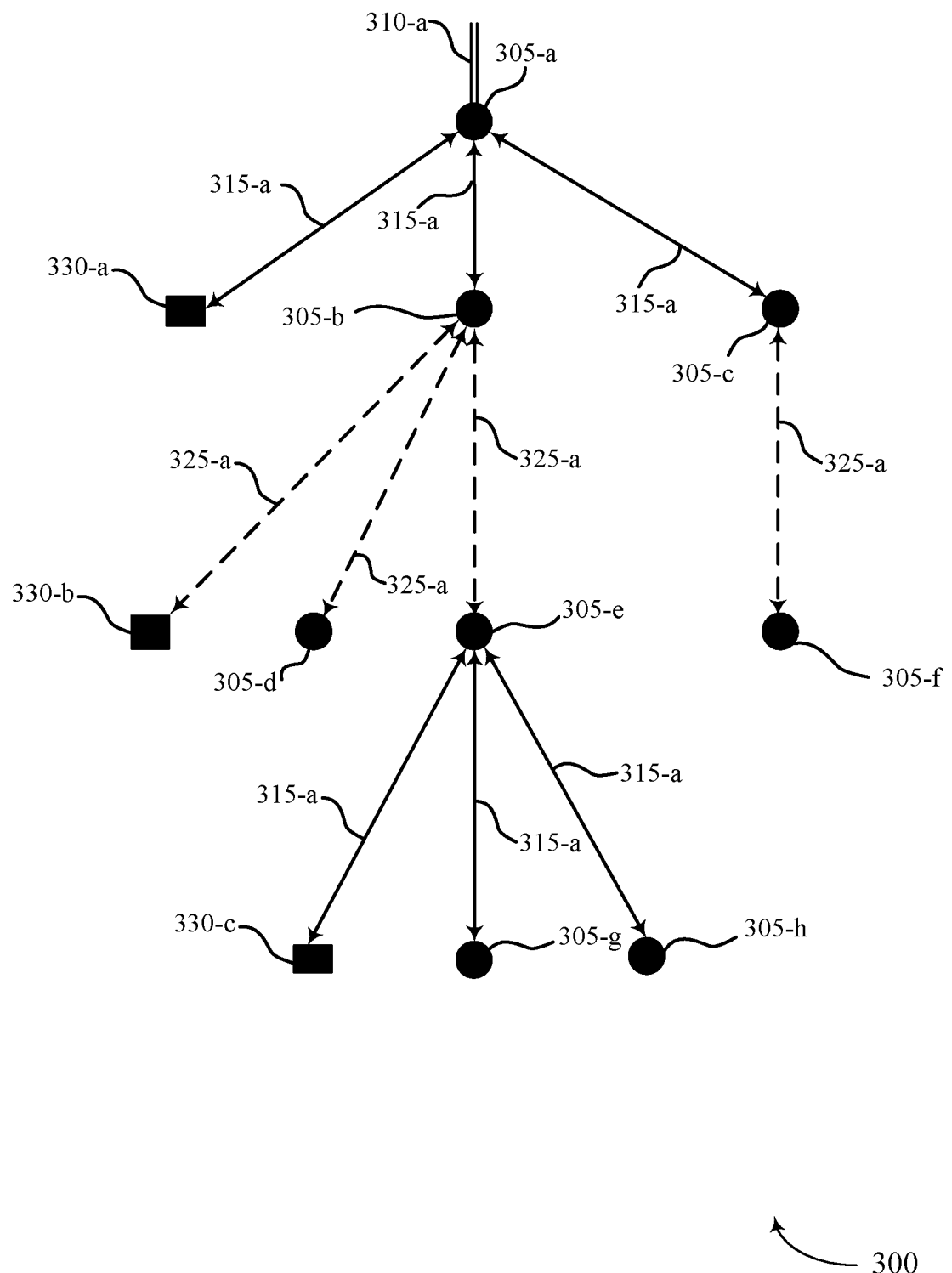
FIG. 3 illustrates an example of a network scheme that supports hop-count indication in wireless systems in accordance with aspects of the present disclosure.

FIG. 3 illustrates an example of a network scheme of a wireless communications system 300 that supports hop-count indication in wireless systems in accordance with aspects of the present disclosure. In some examples, network scheme of wireless communications system 300 may implement aspects of wireless communications systems 100 or 200.

Network scheme of wireless communications system 300 may include multiple ANs 305 and UEs 330 communicating with each other over a one or more wireless links (e.g., backhaul and/or access links). Each backhaul node (i.e., a node in communication with another node via a backhaul link) may support multiple ANFs, UEFs, or any combination thereof. For example, AN 305-*a* may be coupled with wireline backhaul link 310-*a* to provide interfaces to a wireline network. As shown in network scheme of wireless communications system 300, ANs 305-*b*, 305-*c*, 305-*d*, 305-*e*, 305-*f*, 305-*g*, and 305-*h* may be transmission reception points and may support both ANF and UEF functionalities (and therefore may act as relay devices), such as transmitting and receiving data over respective links and UEs 330-*a*, 330-*b*, and 330-*b* may be UEs which may only support UEF functionality.

Wireless communications system 300 may include an anchor AN 305-*a* that is coupled with wired backhaul link 310-*a* to provide interfaces to a wireline network for a system. Further, backhaul and/or access links connect anchor AN 305-*a* to one or more UEs 330 (e.g., UEs 330-*a*) and ANs 305, which may relay information or be further connected to additional UEs 330 and ANs 305 over additional backhaul and/or access links (e.g., according to network scheme of wireless communications system 300 of FIG. 3). The backhaul and/or access links may include wireless links. Each AN 305 may support an ANF and UEF.

In some cases, anchor AN 305-*a* may be connected to a first set of nodes over links 315 (e.g., 315-*a*, 315-*b*, 315-*c*, etc.). For example, anchor AN 305-*a*, which may also be an IAB-donor, may communicate with an AN 305-*b* over link 315-*a*. Anchor AN 305-*a* may further be connected to other IAB-nodes, which may be any combination of ANs 305 and UEs 330 over link 315-*a*. For example, anchor AN 305-*a* may communicate with an IAB-node, which may be UE 330-*a* over link 315-*a*, and also a second IAB-node, which may be AN 305-*c* over link 315-*a*. Additionally, IAB-donor or anchor AN 305-*a* may be connected to an IAB-node or AN 305-*c* over link 315-*a*.

As shown, AN 305-*b* may be connected to AN 305-*d*, AN 305-*e* and UE 330-*b*, all of which may be IAB-nodes and these IAB-nodes may be connected to AN 305-*b* over link 325-*a*. AN-305-*c* may be connected to AN 305-*f* over link 325-*a*. Similar to AN 305-*b*, AN 305-*e* may be connected to UE 330-*c*, AN 305-*g*, and AN 305-*h* over link 315-*a*.

The nodes of wireless communications system 300 may be partitioned into two node sets such that each node belongs to a different node set than its parent nodes and its child nodes. For example, AN 305-*b*, AN-305-*c*, AN 305-*g*, and 305-*h* may be grouped in a first node set, while 305-*d*, AN 305-*e*, and AN 305-*f* may be grouped in a second node set. Similarly, a set of resources may be partitioned into two sets such that each resource set is assigned to one of the node sets. For example, the set of resources may be partitioned into two sets for downlink, uplink, and/or flexible segments, for example, time-frequency resources.

Figure 4A:
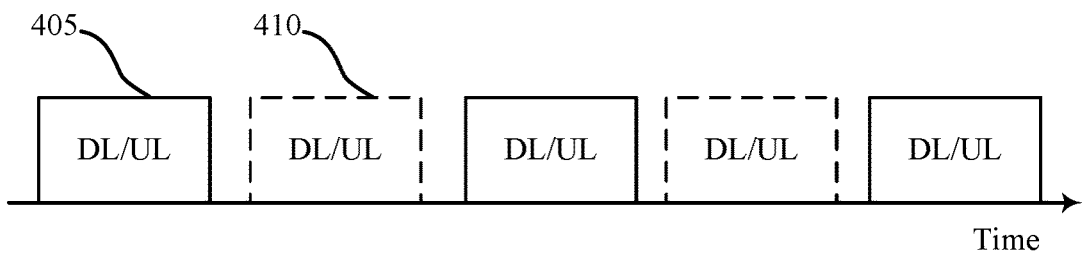
FIGS. 4A and 4B illustrate example resource allocation schemes that support hop-count indication in wireless systems in accordance with aspects of the present disclosure.
Figure 4B:
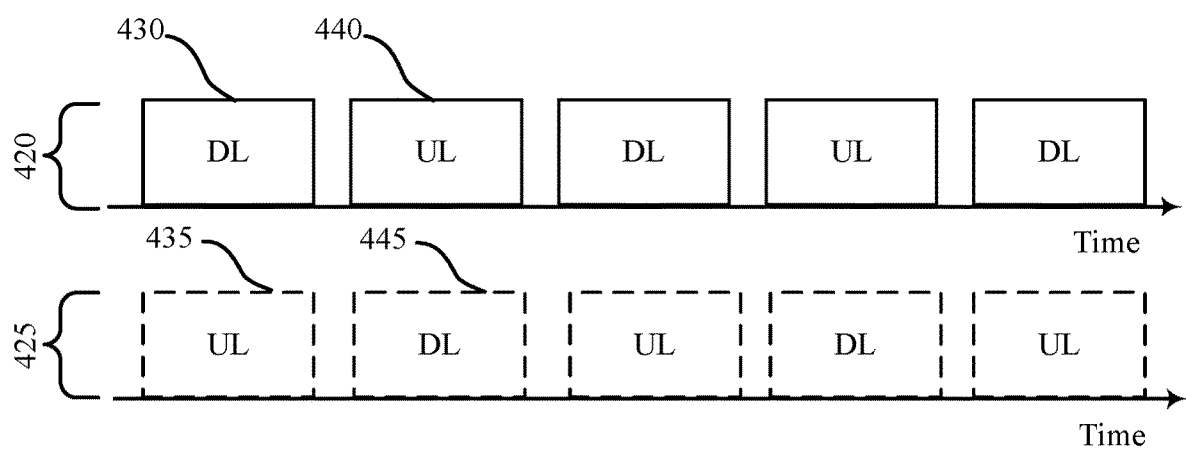

FIGS. 4A and 4B illustrate example resource allocation schemes 400 that support hop-count indication in wireless systems in accordance with various aspects of the present disclosure. In some examples, resource allocation scheme 400 may be implemented by aspects of wireless communications system 100, 200, and/or 300. One or more of resource allocation schemes 400 may be determined and based at least in part on the hop-count.

In FIG. 4A, resource allocation scheme 400 may associate a resource pattern and/or a slot structure to the hop-count which may simplify the signaling of resources to be used by ANs or UEs in an IAB network. For example, an IAB-node may infer the resource pattern that may be allocated to itself or used by another node based on the hop-count and a mapping rule.

In one example, semi-static resource allocation may be a function of hop-count. In the example of FIG. 4A, there may be a two pattern scheme for semi-static resource allocation. In this two pattern scheme, odd hop-counts may be solid line resources and even hop counts may be dotted line resources. In FIG. 4A, the first downlink/uplink resources (e.g., downlink/uplink resources 405) is a solid line resource and may be associated with an odd hop-count. An IAB-node may be able to infer that its parent node is allocated downlink/uplink resources 405 based on a hop-count indicated by the parent node. Additionally or alternatively, the IAB-node may infer the resources allocated for itself based on knowing the hop-count indicated by its parent node. For instance, the IAB-node may be allocated downlink/uplink resources 410 based on the hop-count indicated by its parent network node.

Downlink/uplink resources 410 is a dotted line resource and may be associated with an even hop-count. In some examples, an IAB-node may be able to determine that its parent network node is associated with downlink/uplink resources 410 if its parent network node indicates an even hop-count. Further, the IAB-node may be able to determine resources allocated for itself based on knowing the hop-count indicated by its parent node. For instance, the IAB-node may be allocated downlink-uplink resources 405 based on the hop-count indicated by its parent node.

In FIG. 4B, resource allocation scheme 400-*b* may associate a slot structure with the hop-count which may simplify the signaling of resources allocated to one or more IAB-nodes in an IAB network. In some examples, the slot structure or slot format may be a function of hop-count. The slot format may indicate more details such as, but not limited to, a number of downlink, uplink, and flexible symbols and the corresponding arrangement within a slot, the periodicity of the configuration, and so forth.

In some cases, in resource allocation scheme 400-b, the uplink and downlink directions may be aligned across multiple hops in a wireless communications system. For instance, there may be a two pattern scheme for the slot structure. In this two pattern scheme, odd hop-counts may be solid line resources and even hop counts may be dotted line resources. In FIG. 4B, the first set of links 420 may be a solid line resource and may be associated with an odd hop-count and the second set of links 425 may be a dotted line resource and may be associated with an even hop-count.

As shown, the uplink and downlink directions may alternate in time and across hops. In this example, the downlink resources 430 may be associated with a first set of IAB-nodes or communication links and may correspond to an odd hop-count. Uplink resources 435 may be associated with a second set of IAB-nodes or communication links and may correspond to an even hop-count. Referring to FIG. 3, for instance, the communication links 315-a may be the associated with the first set of links 420 and may be indicative of an odd hop-count and the communication links 325-a may be associated with the second set of link 425 and may be indicative of an even hop-count.

As shown, uplink and downlink directions may alternate for each of the first and second set of links 420 and 425. For instance, the second set of resources are uplink resources 440 in the first set of links 420 and the second set resources are downlink resources 445 in the second set of links 425.

Figure 5:
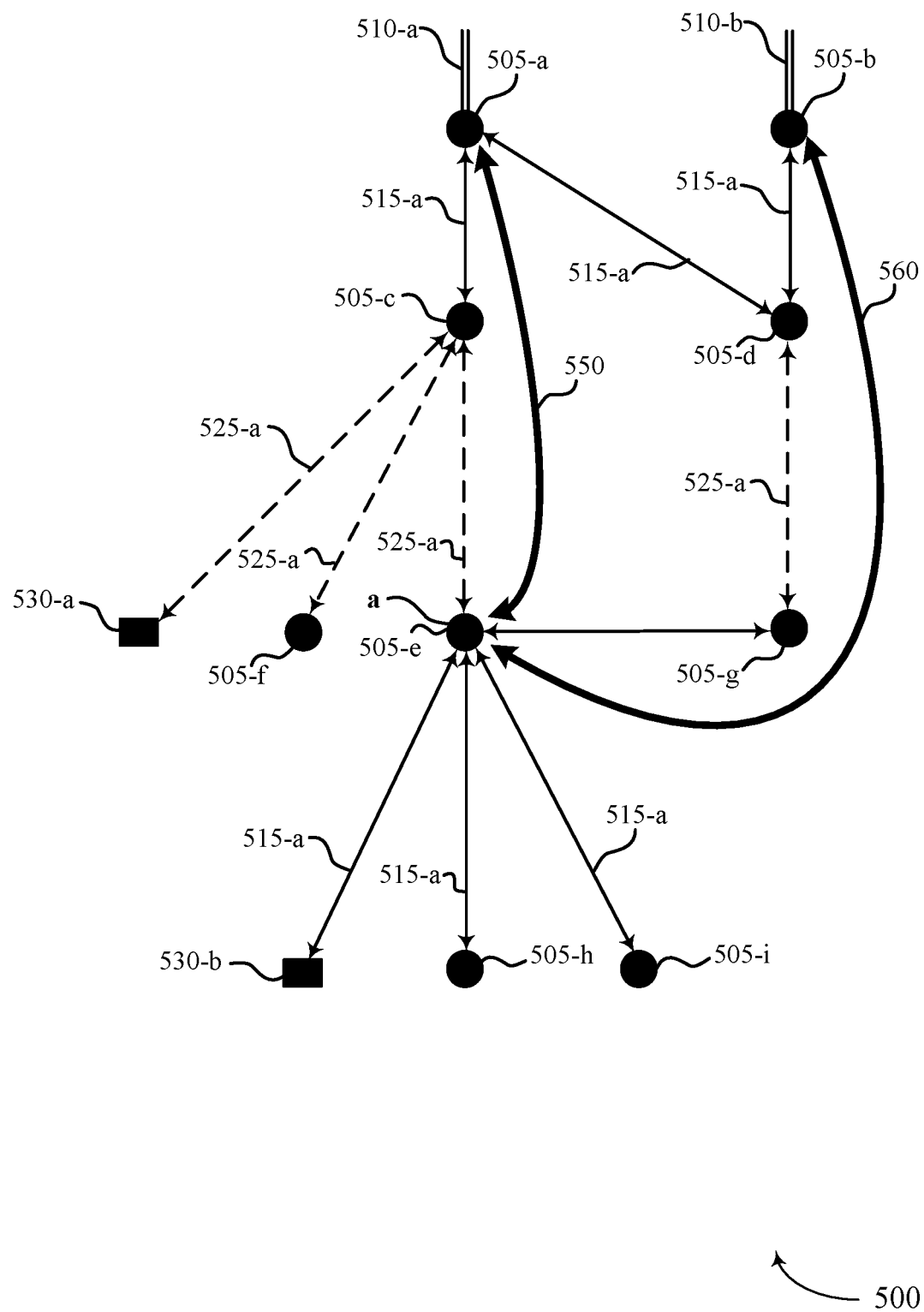
FIG. 5 illustrates an example wireless communications system that supports hop-count indication in wireless systems in accordance with aspects of the present disclosure.

FIG. 5 illustrates an example of a wireless communications system 500 that supports hop-count indication in wireless systems in accordance with various aspects of the present disclosure. In some examples, wireless communications system 500 may implement aspects of wireless communications systems 100, 200, and/or 300, and may be an example of a wireless communications network that operates in mmW spectrum. The wireless communications system 500 may include multiple IAB-donors (e.g., anchor ANs 505-a and 505-b) and IAB-nodes (e.g., ANs 505 and UEs 530) that communicate over a combination of wired and wireless links. These IAB-nodes 505 may be examples of the IAB-nodes as described with reference to FIGS. 1, 2, 3, and 4.

The wireless communications system 500 may include a number of ANs 505 (ANs 505-a, 505-b, 505-c, etc.) and UEs 530 (UEs 530-a and 530-b) that communicate over a combination of wired links 510 (e.g., wired links 510-a and 510-b) and wireless links 515-a. In some cases, the wired links 510 may be core network links, and may connect anchor ANs 505-a and 505-b to the core network (e.g., core network 130 of FIG. 1). The ANs 205 may be examples of the ANs described herein.

In some examples, a wireless communications system may take into consideration child-specific hop-counts. In this example of FIG. 5, AN 505-e has multiple backhaul links and may have two paths (e.g., a first path 550 and a second path 560) to the core network, via the same or different anchor ANs 505-a or 505-b. In FIG. 5, the first path 550 may flow from AN 505-e to AN 505-c, and then to the anchor AN 505-a. The second path 560 may flow from AN 505-e to AN 505-g to AN 505-d, and then to anchor AN 505-b.

In one example, of FIG. 5, the quality of service (QoS) over the two paths 550 and 560 may be different. For example, the quality of service on one of the paths may experience end-to-end (E2E) propagation delay per the number of hops, in which E2E propagation delay may refer to the time taken for a packet to be transmitted across a network from a source to a destination. Additionally, the QoS on the paths may also be affected by the load on intermediate nodes and on the quality of the backhaul links, in which the quality of the backhaul links may be affected by the capacity and/or the stability of the backhaul links.

In some cases, the flow of AN 505-e may be partitioned based on its QoS requirements and the flow may be assigned to different routes within the wireless communications system 500. For example, AN 505-e may serve UEs such as UE 530-b through the first path 550 and serve the child IAB-nodes (AN 505-h and 505-i) through the second path 550. Further, the AN 505-e may indicate different hop-count values to its different child nodes based on which backhaul path it may use to transport the corresponding traffic.

In one example, when serving a flow on first path 550, the AN 505-e may adopt and indicate a hop-count of 2. This hop-count may be used to generate a CSI-RS, a data channel, and/or a control channel, or any combination thereof for devices being served via the first path 550. Additionally, when serving a flow on path 550, the AN 505-e may not be able to accept new requests to be served through path 550, as such the AN 505-e may indicate its hop-count corresponding to the second path 560 in which the hop-count may be 3.

In another example, the hop-count may be indicated in some broadcast signals, such as a signal used for inter-relay discovery and/or in a SIB. In this example, the AN 305-e or IAB-node a may send multiple sets of broadcast signals for various hop-counts, in which the signals used in the different sets of broadcast signals may be different, the occupied time domain and frequency domain (TD/FD) resources may be different, and the periodicity of transmission may be different.

When using broadcast channels such as remaining minimum system information (RMSI) and/or SIBs, AN 505-e may either send a common channel which may carry information about multiple backhaul routes and/or hop-counts, or the AN 505-e may send separate channels such as on separate resources with different periodicities.

Figure 6:
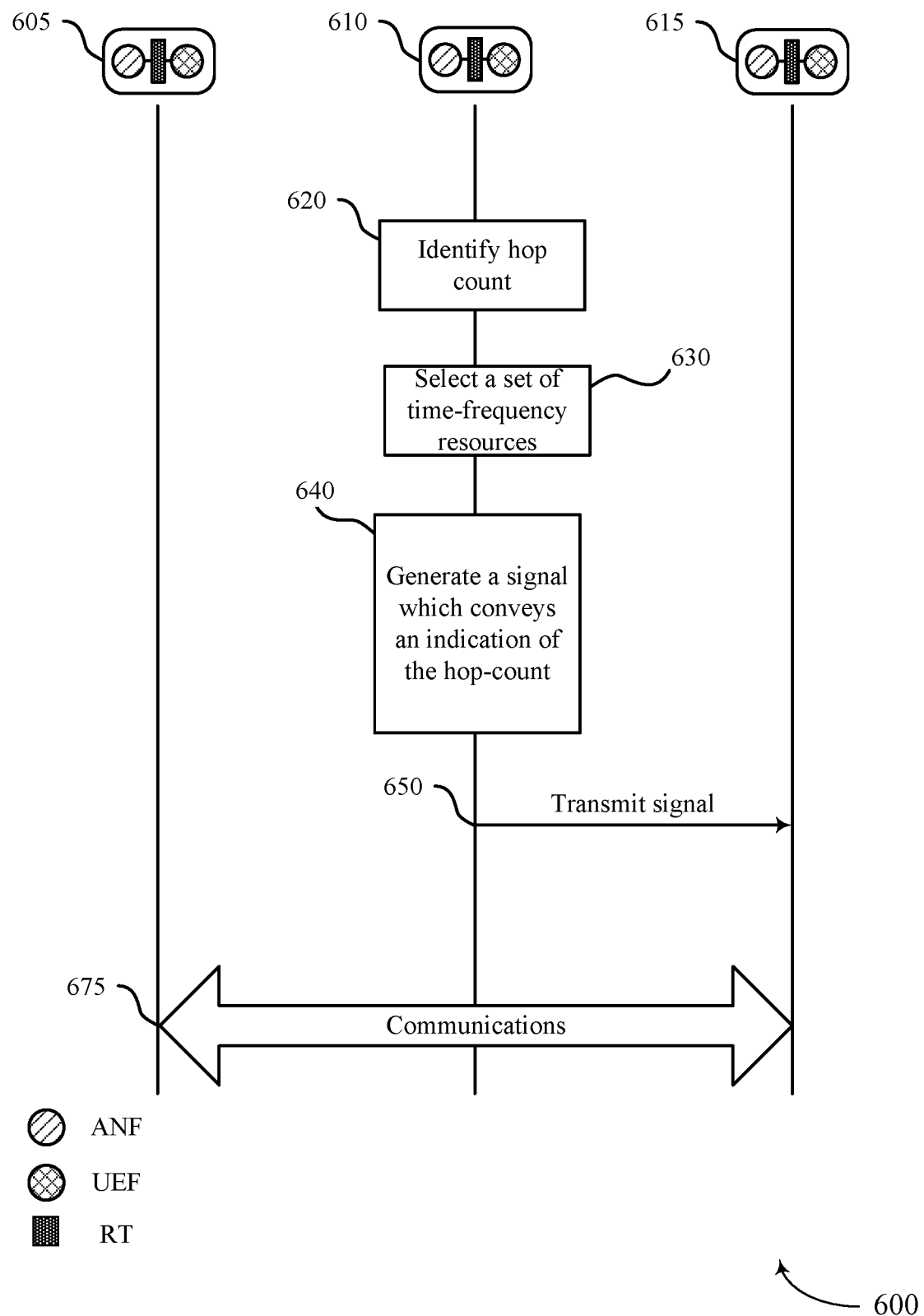
FIG. 6 illustrates an example of a process flow that supports hop-count indication in wireless systems in accordance with aspects of the present disclosure.

FIG. 6 illustrates an example of a process flow 600 that supports hop-count indication in wireless systems in accordance with aspects of the present disclosure. In some examples, process flow 600 may implement aspects of wireless communications systems 100, 200, and 300 and/or scheme 400. The process flow 600 may include multiple IAB-donors (e.g., ANs) and IAB-nodes (e.g., ANs and UEs) that communicate over a combination of wired and wireless links in process flow 600. Network node 605 may be denoted as an anchor AN 605 (or other network node used for a hop-count (e.g., a synchronization node)), while network node 610 may be a relay network node (e.g., an AN, a UE that supports ANF, or any other node capable of being a parent network node to network node 615) and network node 615 may be a child network node or an access device (e.g., a UE that does not support ANF).

In the following description of the process flow 600, the operations between network node 605, relay node 610, and child network node 615 may correspond to uplink or downlink signaling over wireless backhaul links and/or wireless access links. Signaling between network node 605, relay node 610, and child network node 615 may be direct, or indirect.

At 620, relay node 610 may identify a hop-count between the relay network node 610 and the network node 605. In some examples, the distance or number of links between the relay network node 610 and the network node 605 may be a single path. In other topologies (e.g., as illustrated in the wireless communications system 500 of FIG. 5), a network node may have multiple paths to one or more anchor nodes or other network nodes in the system. In such a topology, the hop-count may be defined as the "shortest" distance or fewest number of links to an anchor node or other network node.

At 630, a set of time-frequency resources for transmission of a signal to a second network node 615 may be selected. In some examples, the time-frequency resources may be selected based on the hop-count. For instance, certain sets of resources may be used when indicating a particular hop-count value.

At 640, a signal may be generated based at least in part on a generation sequence. The signal may convey an indication of the hop-count identified at 620. In some cases, the indication of the hop-count may be based at least in part on the set of time-frequency resources selected at 630 or the generation sequence itself. For instance, the generation sequence may be a scrambling sequence that conveys the hop-count and the scrambling sequence may be used for scrambling the data or control channel. In other examples, a DMRS associated with a data or control channel may be scrambled or generated using a generation sequence that conveys the hop-count. The hop-count may be indicated through any of a CSI-RS, a data channel, a control channel. In another example, the hop-count may be indicated through other types of signaling such as a SIB and may also be used in generating a signal including, but not limited to, a CSI-RS, a data channel, and a control channel.

At 650, the signal generated at 640 may be transmitted over the set of time-frequency resources to the child network node 615. Based on the hop-count, the child network node 615 may communicate (e.g., communications 675) with the relay network node 610 or the anchor network node 605 (e.g., via a communication path associated with the hop-count or via resources allocated based on the hop-count).

Figure 7:
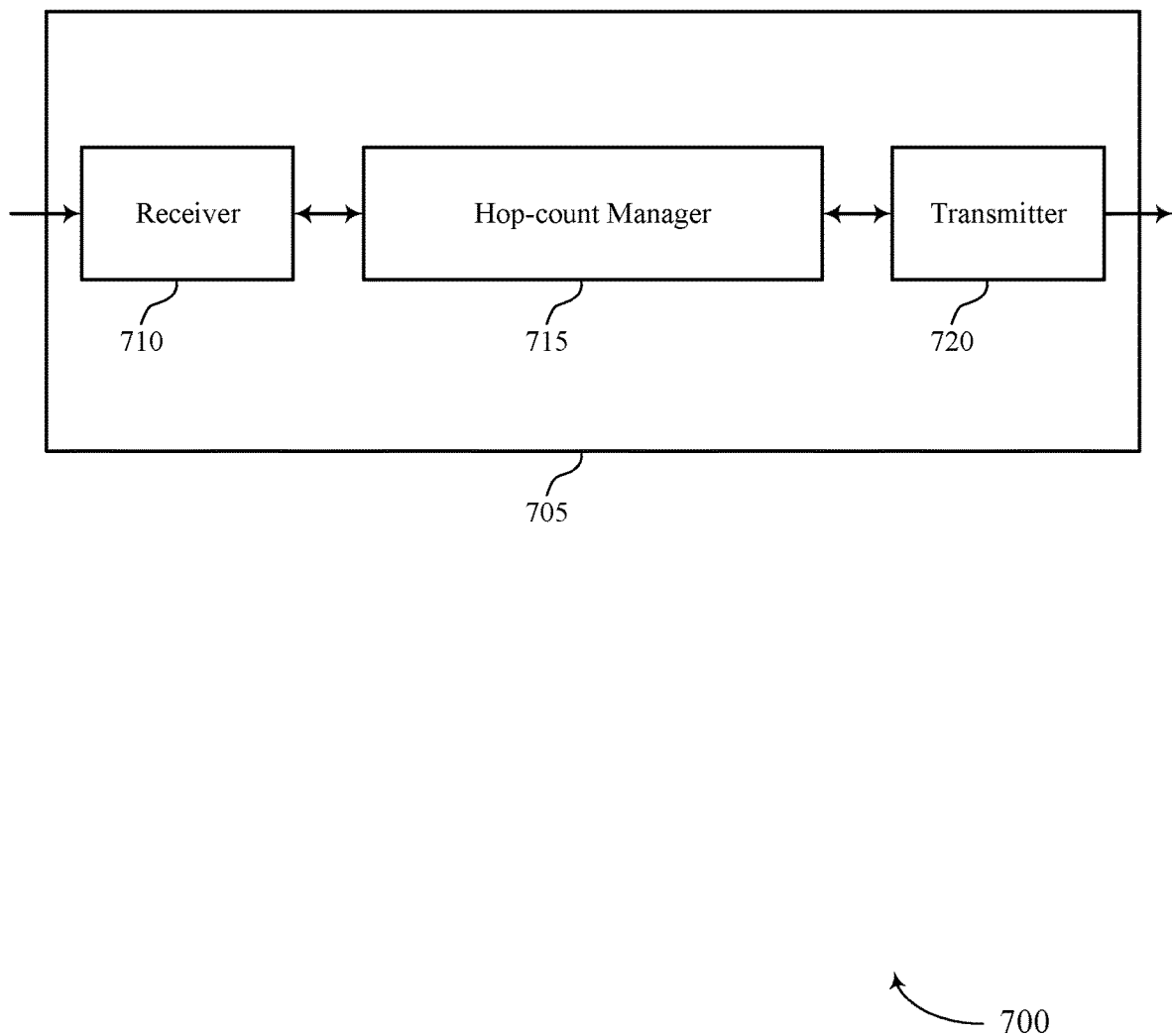
FIGS. 7 and 8 show block diagrams of devices that support hop-count indication in wireless systems in accordance with aspects of the present disclosure.

FIG. 7 shows a block diagram 700 of a device 705 that supports hop-count indication in wireless systems in accordance with aspects of the present disclosure. The device 705 may be an example of aspects of a relay network node (e.g., a UE 115 or base station 105), a child network node, or an access device as described herein. The device 705 may include a receiver 710, a hop-count manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to hop-count indication in wireless systems, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

When operating as a relay network node, the hop-count manager 715 may identify a hop-count between the relay network node and a network node in the wireless communications system, select a set of time-frequency resources for transmission of a signal to a second network node in the wireless communications system, generate the signal based on a generation sequence, where the signal conveys an indication of the hop-count and the indication of the hop-count is based on the set of time-frequency resources or the generation sequence, and transmit the signal over the set of time-frequency resources to the second network node. Additionally or alternatively, the hop-count manager 715 may identify a hop-count between the relay network node and a network node in the wireless communications system, select, based on the hop count, a set of time-frequency resources for transmission of a signal to a second network node in the wireless communications system, and transmit the signal over the set of time-frequency resources to the second network node. Additionally or alternatively, the hop-count manager 715 may receive a resource configuration from a control node, and select the set of time-frequency resources based on the resource configuration.

The hop-count manager 715 may also identify a first communication path from the relay network node to a first anchor network node of the wireless communications system, where the first communication path is associated with a first hop-count and a first QoS, identify a second communication path from the relay network node to a second anchor network node of the wireless communications system, where the second communication path is associated with a second hop-count and a second QoS, and indicate at least one of the first hop-count or the second hop-count to a child network node or an access device in communication with the relay network node. Additionally or alternatively, the hop-count manager 715 may identify a first communication path from the relay network node to a first anchor network node of the wireless communications system, where the first communication path is associated with a first hop-count and a first QoS, identify a second communication path from the relay network node to a second anchor network node of the wireless communications system, where the second communication path is associated with a second hop-count and a second QoS, and transmit a signal to a child network node or an access device in communication with the relay network node, where the signal conveys an indication of at least one of the first hop-count or the second hop-count. The hop-count manager 715 may be an example of aspects of the hop-count manager 1010 or 1110 as described herein.

When operating as a control node (e.g., a control node in an IAB system), the hop-count manager 715 may identify a hop-count between a relay network node and a network node in the wireless communications system, select, based on the hop count, a set of time-frequency resources for transmission of a signal to a second network node in the wireless communications system, and transmit a resource configuration associated with the set of time-frequency resources to the second network node.

When operating as a control node (e.g., a control node in an IAB system), the hop-count manager 715 may determine a resource configuration for a relay network node in the wireless communications system, where the resource configuration is associated with a set of time-frequency resources selectable, based on a hop-count between the relay network node and a network node in the wireless communications system, for communication with the network node, and transmit the resource configuration to the relay network node. The hop-count manager 715 may identify the hop-count between the relay network node and the network node, and select the set of time-frequency resources based on the hop-count. The resource configuration may be associated with multiple sets of time-frequency resources, and one or more of the multiple sets may be selectable by the relay network node based on the hop-count.

When operating as a child network node or access device, the hop-count manager 715 may receive a signal from a relay network node in the wireless communications system, determine a hop-count between the relay network node and a second network node in the wireless communications system based on the received signal, and communicate with the relay network node based on the hop-count.

When operating as a network node (e.g., a child network node or access device, or a first network node in an IAB system), the hop-count manager 715 may receive a signal from a relay network node in the wireless communications system, the signal indicative of a hop-count between the relay network node and a second network node in the wireless communications system, determine the hop-count between the relay network node and the second network node based on the received signal, and communicate with the relay network node or a child network node based on the hop-count. The hop-count manager 715 may receive a signal from a relay network node in the wireless communications system, the signal indicative of a hop-count between the relay network node and a second network node in the wireless communications system, determine a set of time-frequency resources for communication with the relay network node or a child network node based on the hop-count, and communicate with the relay network node or the child network node based on the set of time-frequency resources. Additionally or alternatively, the hop-count manager 715 may receive a signal from a relay network node in the wireless communications system, the signal indicative of a first hop-count associated with a first communication path and a first QoS or a second hop-count associated with a second communication path and a second QoS, and communicate with the relay network node or a child network node via the first communication path or the second communication path based on the signal.

The hop-count manager 715, or its sub-components, may be implemented in hardware, code (e.g., software or firmware) executed by a processor, or any combination thereof. If implemented in code executed by a processor, the functions of the hop-count manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The hop-count manager 715, or its sub-components, may be physically located at various positions, including being distributed such that portions of functions are implemented at different physical locations by one or more physical components. In some examples, the hop-count manager 715, or its sub-components, may be a separate and distinct component in accordance with various aspects of the present disclosure. In some examples, the hop-count manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the hop-count manager 715 as described herein may be implemented to realize one or more potential advantages. One implementation may allow a UE 115 to identify a hop-count between network nodes (e.g., relay network nodes, network nodes, child network nodes) in a wireless communications system. A UE 115 may utilize hop-counts to efficiently identify or convey resource allocation schemes or communication paths suitable for transmission and reception of data, resulting in an efficient use of system resources, power savings, and increased performance.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
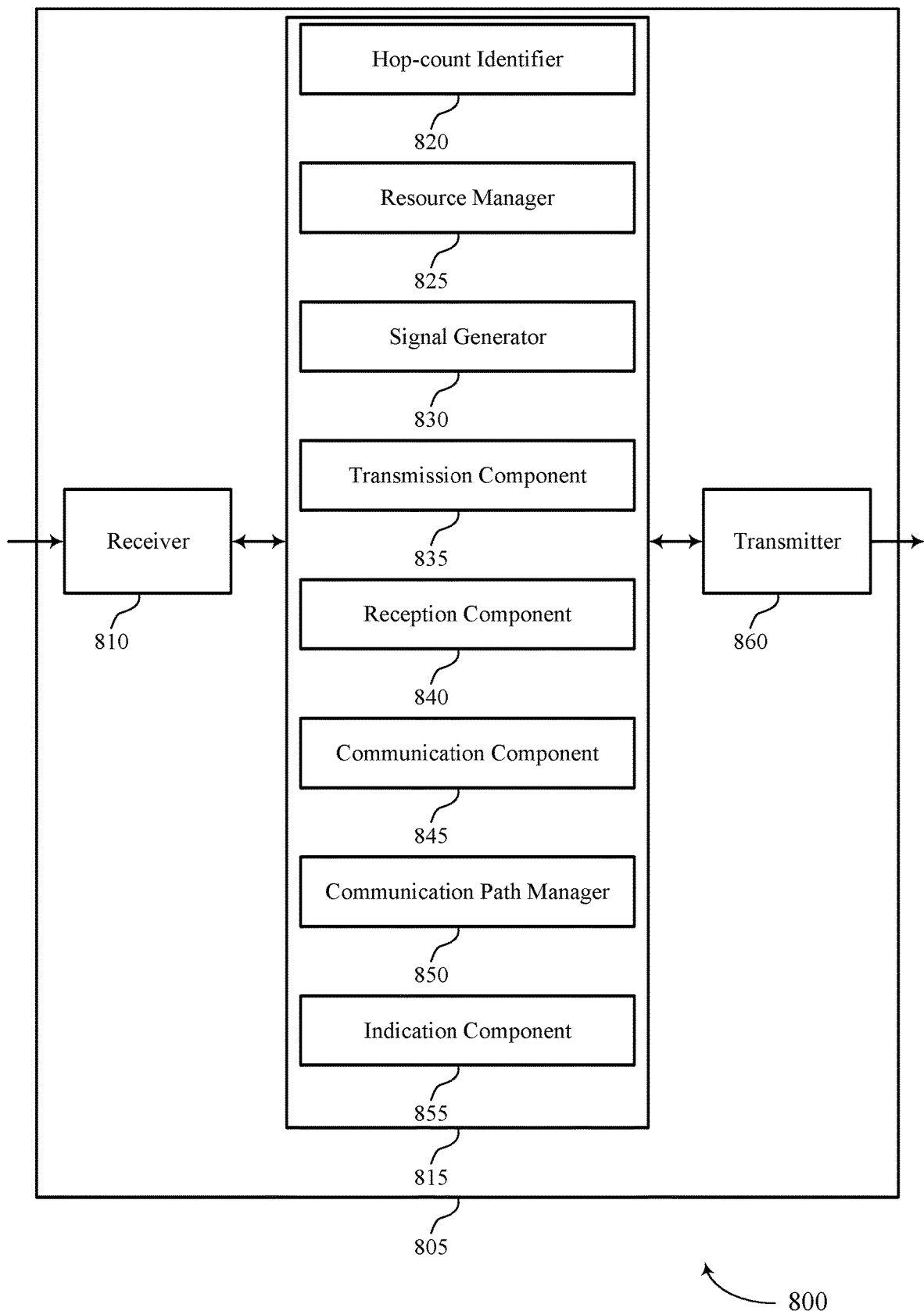

FIG. 8 shows a block diagram 800 of a device 805 that supports hop-count indication in wireless systems in accordance with aspects of the present disclosure. The device 805 may be an example of aspects of a device 705, relay network node (e.g., a UE 115 or base station 105), a child network node, or an access device as described herein. The device 805 may include a receiver 810, a hop-count manager 815, and a transmitter 860. The device 805 may also include a processor. Each of these components may be in communication with one another (e.g., via one or more buses).

Receiver 810 may receive information such as packets, user data, or control information associated with various information channels (e.g., control channels, data channels, and information related to hop-count indication in wireless systems, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The hop-count manager 815 may be an example of aspects of the hop-count manager 715 as described herein. The hop-count manager 815 may include a hop-count identifier 820, a resource manager 825, a signal generator 830, a transmission component 835, a reception component 840, a communication component 845, a communication path manager 850, and an indication component 855. The hop-count manager 815 may be an example of aspects of the hop-count manager 1010 or 1110 as described herein.

When operating as a relay network node, the hop-count identifier 820 may identify a hop-count between the relay network node and a network node in the wireless communications system. The resource manager 825 may select a set of time-frequency resources for transmission of a signal to a second network node in the wireless communications system. The resource manager 825 may select the set of time-frequency resources, for example, based on the hop-count. The signal generator 830 may generate the signal based on a generation sequence, where the signal conveys an indication of the hop-count and the indication of the hop-count is based on the set of time-frequency resources or the generation sequence. The transmission component 835 may transmit the signal over the set of time-frequency resources to the second network node. Additionally or alternatively, the resource manager 825 may receive a resource configuration from a control node, and select the set of time-frequency resources based on the resource configuration.

When operating as a control node (e.g., a control node in an IAB system), the hop-count identifier 820 may identify a hop-count between a relay network node and a network node in the wireless communications system. The resource manager 825 may select, based on the hop count, a set of time-frequency resources for transmission of a signal to a second network node in the wireless communications system. The transmission component 835 may transmit a resource configuration associated with the set of time-frequency resources to the second network node.

When operating as a control node (e.g., a control node in an IAB system), the resource manager 825 may determine a resource configuration for a relay network node in the wireless communications system, where the resource configuration is associated with a set of time-frequency resources selectable, based on a hop-count between the relay network node and a network node in the wireless communications system, for communication with the network node. The transmission component 835 may transmit the resource configuration to the relay network node. The hop-count identifier 820 may identify the hop-count between the relay network node and the network node, and the resource manager 825 may select the set of time-frequency resources based on the hop-count. The resource configuration may be associated with multiple sets of time-frequency resources, and one or more of the multiple sets may be selectable by the relay network node based on the hop-count.

When operating as a child network node or access device, the reception component 840 may receive a signal from a relay network node in the wireless communications system. The hop-count identifier 820 may determine a hop-count between the relay network node and a second network node in the wireless communications system based on the received signal. The communication component 845 may communicate with the relay network node based on the hop-count.

When operating as a network node (e.g., a child network node or access device, or a first network node in an IAB system), the reception component 840 may receive a signal from a relay network node in the wireless communications system, the signal indicative of a hop-count between the relay network node and a second network node in the wireless communications system. The hop-count identifier 820 may determine the hop-count between the relay network node and the second network node based on the received signal, and the communication component 845 may communicate with the relay network node or a child network node based on the hop-count.

Additionally or alternatively, the reception component 840 may receive a signal from a relay network node in the wireless communications system, the signal indicative of a hop-count between the relay network node and a second network node in the wireless communications system, the resource manager 825 may determine a set of time-frequency resources for communication with the relay network node or a child network node based on the hop-count, and the communication component 845 may communicate with the relay network node or the child network node based at least in part on the set of time-frequency resources.

Additionally or alternatively, the reception component 840 may receive a signal from a relay network node in the wireless communications system, the signal indicative of a first hop-count associated with a first communication path and a first QoS or a second hop-count associated with a second communication path and a second QoS, and the communication component 845 may communicate with the relay network node or a child network node via the first communication path or the second communication path based on the signal.

When operating as a relay network node, the communication path manager 850 may identify a first communication path from the relay network node to a first anchor network node of the wireless communications system, where the first communication path is associated with a first hop-count and a first QoS and identify a second communication path from the relay network node to a second anchor network node of the wireless communications system, where the second communication path is associated with a second hop-count and a second QoS. The indication component 855 may indicate at least one of the first hop-count or the second hop-count to a child network node or an access device in communication with the relay network node. The transmission component 835 may transmit a signal to a child network node or an access device in communication with the relay network node, where the signal conveys an indication of at least one of the first hop-count or the second hop-count.

Transmitter 860 may transmit signals generated by other components of the device 805. In some examples, the transmitter 860 may be collocated with a receiver 810 in a transceiver module. For example, the transmitter 860 may be an example of aspects of the transceiver 1020 or 1120 as described with reference to FIGS. 10 and 11. The transmitter 860 may utilize a single antenna or a set of antennas.

Figure 9:
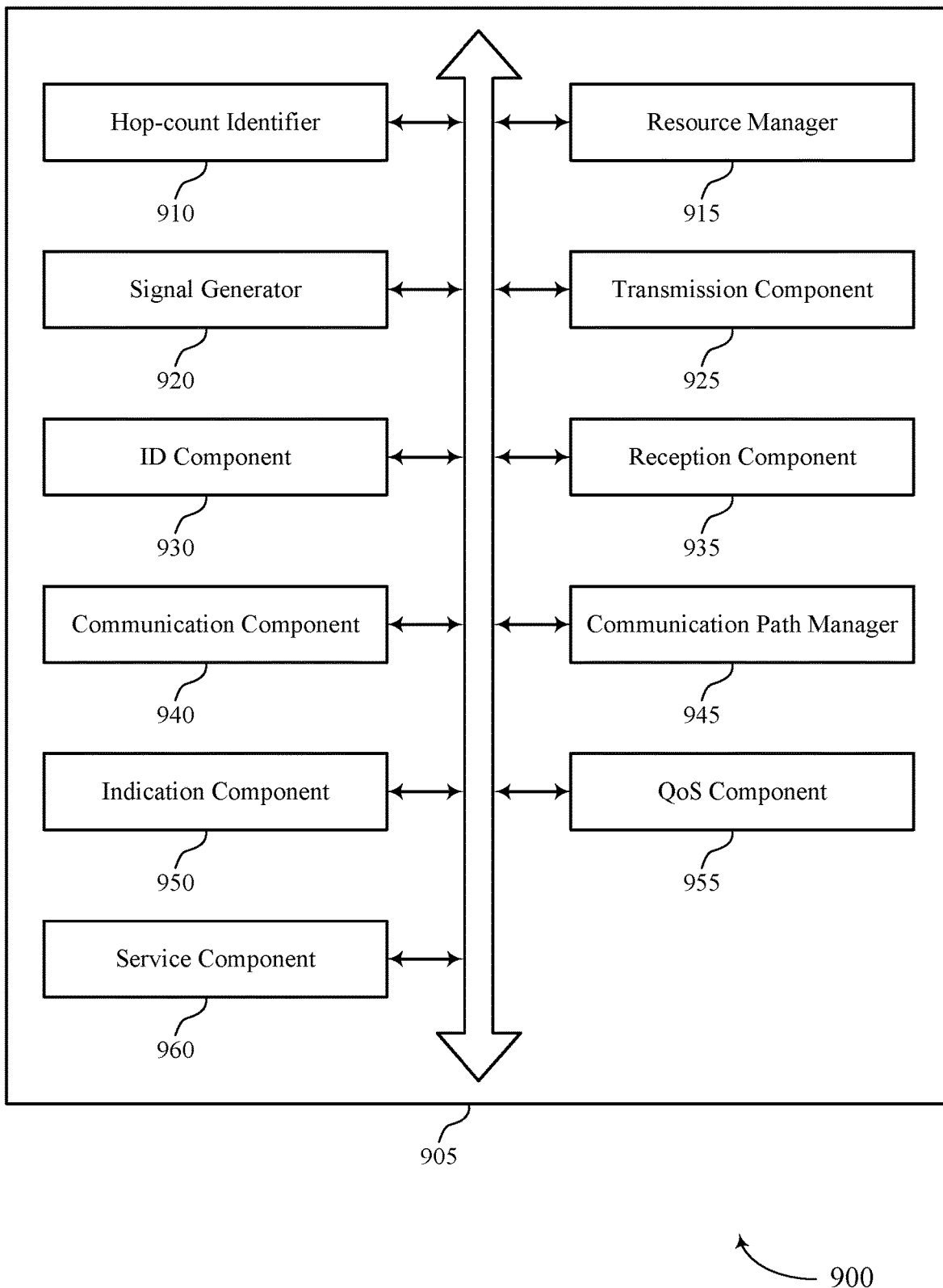
FIG. 9 shows a block diagram of a hop-count manager that supports hop-count indication in wireless systems in accordance with aspects of the present disclosure.

FIG. 9 shows a block diagram 900 of a hop-count manager 905 that supports hop-count indication in wireless systems in accordance with aspects of the present disclosure. The hop-count manager 905 may be an example of aspects of a hop-count manager 715, a hop-count manager 815, or a hop-count manager 1010 described herein. The hop-count manager 905 may include a hop-count identifier 910, a resource manager 915, a signal generator 920, a transmission component 925, an ID component 930, a reception component 935, a communication component 940, a communication path manager 945, an indication component 950, a QoS component 955, and a service component 960. Each of these modules may communicate, directly or indirectly, with one another (e.g., via one or more buses).

The hop-count identifier 910 may identify a hop-count between the relay network node and a network node in the wireless communications system. In some examples, the hop-count identifier 910 may determine a hop-count between the relay network node and a second network node in the wireless communications system based on the received signal. In some cases, the hop-count identifier 910 may determine the hop-count based on the set of time-frequency resources. In some aspects, the hop-count identifier 910 may determine the hop-count based on the DMRS sequence. In some instances, the hop-count identifier 910 may determine the hop-count based on the generation sequence.

In some examples, the hop-count identifier 910 may determine the hop-count for communication with the relay network node or a child network node based on the common channel. In some cases, the network node is an anchor network node. In some aspects, the set of time-frequency resources conveys an indication of the hop-count. In some instances, the generation sequence includes a scrambling sequence or a base sequence. In some examples, the generation sequence conveys an indication of the hop-count.

The resource manager 915 may select a set of time-frequency resources for transmission of a signal to a second network node in the wireless communications system. In some examples, the resource manager 915 may select, based on the hop-count, the set of time-frequency resources. In some examples, the resource manager 915 may determine, based on the hop-count, a resource pattern or a slot structure for the relay network node, downlink resources for the relay network node, uplink resources for the relay network node, a parent network node in communication with the relay network node, a child network node in communication with the relay network node, an access device in communication with the relay network node, or any combination thereof. In some cases, the resource manager 915 may determine a resource pattern or a slot structure for communication with the relay network node based on the hop-count, where the resource pattern or the slot structure is determined based on a mapping rule. Additionally or alternatively, the resource manager 915 may select a set of time-frequency resources based on a resource configuration.

The resource manager 915 may determine a resource configuration for a relay network node in the wireless communications system, where the resource configuration is associated with a set of time-frequency resources selectable, based on a hop-count between the relay network node and a network node in the wireless communications system, for communication with the network node. The resource manager 915 may select the set of time-frequency resources based on the hop-count between the relay network node and the network node. The resource configuration may be associated with multiple sets of time-frequency resources, and one or more of the multiple sets may be selectable by the relay network node based on the hop-count.

In some aspects, the resource pattern or the slot structure is determined based on a mapping rule. In some instances, the resource pattern or the slot structure is associated with a semi-static resource allocation. In some examples, the resource pattern or the slot structure is associated with a semi-static resource allocation.

The signal generator 920 may generate the signal based on a generation sequence, where the signal conveys an indication of the hop-count and the indication of the hop-count is based on the set of time-frequency resources or the generation sequence. In some examples, the signal generator 920 may generate a CSI-RS, a TRS, an SRS, a control channel, a data channel, or a DMRS associated with the control channel or the data channel based on the set of time-frequency resources, where the set of time-frequency resources conveys the indication of the hop-count. In some cases, the signal generator 920 may generate a DMRS sequence associated with a control channel or a data channel, where the DMRS sequence conveys the indication of the hop-count. In some aspects, the signal generator 920 may generate a CSI-RS, a TRS, an SRS, a control channel, or a data channel based on the generation sequence, where the generation sequence conveys the indication of the hop-count. In some cases, the generation sequence is a scrambling sequence or a base sequence.

The transmission component 925 may transmit the signal over the set of time-frequency resources to the second network node. In some examples, the transmission component 925 may indicate the hop-count via a second signal different from the signal. In some cases, the second signal includes a SIB. In some examples, the transmission component 925 may transmit a signal to a child network node or an access device in communication with the relay network node, where the signal conveys an indication of at least one of a first hop-count or a second hop-count. The transmission component 925 may transmit a first signal to the child network or the access device, where the first signal is generated based on a first generation sequence and conveys an indication of the first hop-count, and the indication of the first hop-count is based on a first set of time-frequency resources allocated for the first signal or the first generation sequence. In some aspects, the transmission component 925 may transmit a second signal to the child network or the access device, where the second signal is generated based on a second generation sequence and conveys an indication of the second hop-count, and the indication of the second hop-count is based on a second set of time-frequency resources allocated for the second signal or the second generation sequence. In some aspects, the transmission component 835 may transmit a resource configuration (e.g., a resource configuration determined by the resource manager 915) to the relay network node.

The reception component 935 may receive a signal from a relay network node in the wireless communications system. The signal may be indicative, for example, of a hop-count between the relay network node and a second network node in the wireless communications system. In some examples, the signal may be indicative of a first hop-count associated with a first communication path and a first QoS or a second hop-count associated with a second communication path and a second QoS. In some examples, the reception component 935 may receive, over a set of time-frequency resources, at least one of a CSI-RS, a TRS, an SRS, a control channel, a data channel, or a DMRS associated with the control channel or the data channel. In some cases, the reception component 935 may receive a DMRS sequence associated with a control channel or a data channel. In some aspects, the reception component 935 may receive at least one of a CSI-RS, a TRS, an SRS, a control channel, or a data channel associated with a generation sequence. In some instances, the reception component 935 may receive a common channel carrying information related to multiple hop-counts. Additionally or alternatively, the reception component 935 may receive a resource configuration from a control node.

In some cases, the DMRS sequence conveys an indication of the hop-count. In some examples, the signal is a broadcast signal. In some aspects, a set of time-frequency resources associated with the signal or a periodicity of the signal indicates the hop-count.

The communication component 940 may communicate with the relay network node or a child network node based on the hop-count. In some examples, the communication component 940 may communicate with the relay network node or a child network node based on the set of time-frequency resources. The communication component 940 may communicate with the relay network node or a child network node via the first communication path or the second communication path based on the signal (e.g., signal indicative of hop-count). In some examples, the communication component 940 may communicate with the relay network node or a child network node based on the resource pattern, the slot structure, or a combination thereof.

The communication path manager 945 may identify a first communication path from the relay network node to a first anchor network node of the wireless communications system, where the first communication path is associated with a first hop-count and a first QoS. In some examples, the communication path manager 945 may identify a second communication path from the relay network node to a second anchor network node of the wireless communications system, where the second communication path is associated with a second hop-count and a second QoS. In some cases, the first hop-count and the second hop-count are the same. In some aspects, the first anchor network node and the second anchor network node are the same.

The indication component 950 may indicate at least one of the first hop-count or the second hop-count to a child network node or an access device in communication with the relay network node. In some examples, the indication component 950 may indicate the second hop-count to the child network node or the access device. In some cases, the indication component 950 may generate a first signal based on a first generation sequence, where the first signal conveys an indication of the first hop-count and the indication of the first hop-count is based on a first set of time-frequency resources allocated for the first signal or the first generation sequence. In some aspects, the indication component 950 may generate a second signal based on a second generation sequence, where the second signal conveys an indication of the second hop-count and the indication of the second hop-count is based on a second set of time-frequency resources allocated for the second signal or the second generation sequence. In some instances, the indication component 950 may generate a common channel carrying information related to the first and second communication paths.

In some examples, the first and second signals are broadcast signals transmitted over different time-frequency resources or at different periodicities. In some cases, the information related to the first and second communication paths includes the first and second hop-counts.

The ID component 930 may determine that one or more nodes of the wireless communications system shared a cell ID with the relay network node. In some examples, the ID component 930 may generate a second ID based on the cell ID and the hop-count, where the second ID is used as the generation sequence for generating the signal. In some cases, the second ID is generated based on a sibling count or a random value.

The QoS component 955 may determine the first QoS based on the first hop-count, a network load of one or more network nodes associated with the first communication path, a backhaul link capacity between the one or more network nodes associated with the first communication path, or a stability of the backhaul link between the one or more network nodes associated with the first communication path, or a combination thereof. In some examples, the QoS component 955 may determine the second QoS based on the second hop-count, the network load of one or more network nodes associated with the second communication path, a backhaul link capacity between the one or more network nodes associated with the second communication path, or a stability of the backhaul link between the one or more network nodes associated with the second communication path, or a combination thereof.

The service component 960 may serve the child network node in communication with the relay network node via the first communication path. In some examples, the service component 960 may serve the access device in communication with the relay network node via the second communication path. In some cases, the service component 960 may determine that new requests cannot be served via the first communication path.

Figure 10:
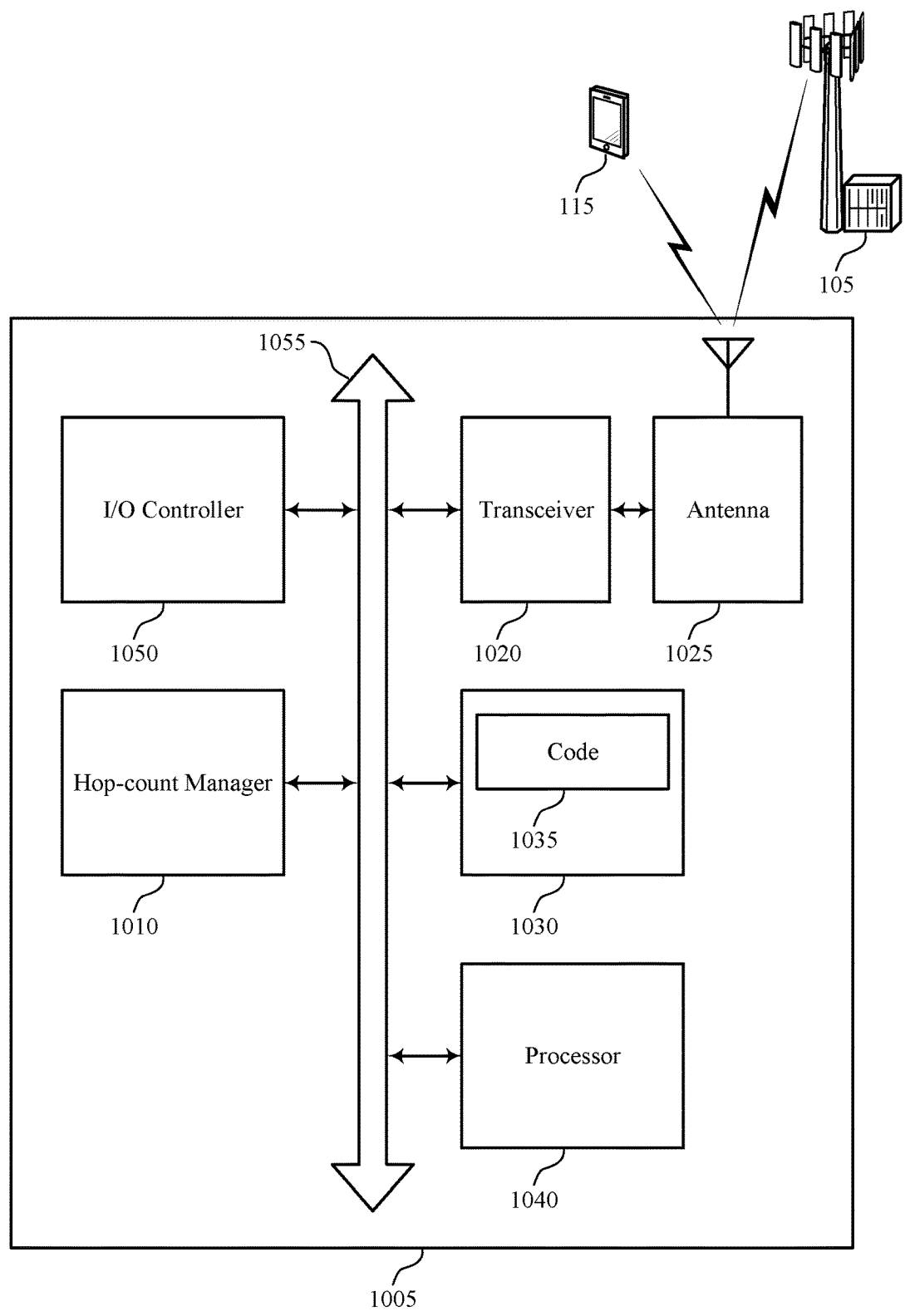
FIG. 10 shows a diagram of a system including a user equipment (UE) that supports hop-count indication in wireless systems in accordance with aspects of the present disclosure.

FIG. 10 shows a diagram of a system 1000 including a device 1005 that supports hop-count indication in wireless systems in accordance with aspects of the present disclosure. The device 1005 may be an example of or include the components of device 705, device 805, or a UE 115 as described herein. The device 1005 may include components for bi-directional voice and data communications including components for transmitting and receiving communications, including a hop-count manager 1010, a transceiver 1020, an antenna 1025, memory 1030, a processor 1040, and an I/O controller 1050. These components may be in electronic communication via one or more buses (e.g., bus 1055).

When operating as a relay network node, the hop-count manager 1010 may identify a hop-count between the relay network node and a network node in the wireless communications system, select a set of time-frequency resources for transmission of a signal to a second network node in the wireless communications system, generate the signal based on a generation sequence, where the signal conveys an indication of the hop-count and the indication of the hop-count is based on the set of time-frequency resources or the generation sequence, and transmit the signal over the set of time-frequency resources to the second network node. Additionally or alternatively, the hop-count manager 1010 may identify a hop-count between the relay network node and a network node in the wireless communications system, select, based on the hop count, a set of time-frequency resources for transmission of a signal to a second network node in the wireless communications system, and transmit the signal over the set of time-frequency resources to the second network node. Additionally or alternatively, the hop-count manager 1010 may receive a resource configuration from a control node, and select a set of time-frequency resources based on the resource configuration.

The hop-count manager 1010 may also identify a first communication path from the relay network node to a first anchor network node of the wireless communications system, where the first communication path is associated with a first hop-count and a first QoS, identify a second communication path from the relay network node to a second anchor network node of the wireless communications system, where the second communication path is associated with a second hop-count and a second QoS, and indicate at least one of the first hop-count or the second hop-count to a child network node or an access device in communication with the relay network node. Additionally or alternatively, the hop-count manager 1010 may identify a first communication path from the relay network node to a first anchor network node of the wireless communications system, where the first communication path is associated with a first hop-count and a first QoS, identify a second communication path from the relay network node to a second anchor network node of the wireless communications system, where the second communication path is associated with a second hop-count and a second QoS, and transmit a signal to a child network node or an access device in communication with the relay network node, where the signal conveys an indication of at least one of the first hop-count or the second hop-count.

When operating as a control node (e.g., a control node in an IAB system), the hop-count manager 1010 may identify a hop-count between a relay network node and a network node in the wireless communications system, select, based on the hop count, a set of time-frequency resources for transmission of a signal to a second network node in the wireless communications system, and transmit a resource configuration associated with the set of time-frequency resources to the second network node.

When operating as a control node (e.g., a control node in an IAB system), the hop-count manager 1010 may determine a resource configuration for a relay network node in the wireless communications system, where the resource configuration is associated with a set of time-frequency resources selectable, based on a hop-count between the relay network node and a network node in the wireless communications system, for communication with the network node, and transmit the resource configuration to the relay network node. The hop-count manager 1010 may identify the hop-count between the relay network node and the network node, and select the set of time-frequency resources based on the hop-count. The resource configuration may be associated with multiple sets of time-frequency resources, and one or more of the multiple sets may be selectable by the relay network node based on the hop-count.

When operating as a child network node or an access device, the hop-count manager 1010 may also receive a signal from a relay network node in the wireless communications system, determine a hop-count between the relay network node and a second network node in the wireless communications system based on the received signal, and communicate with the relay network node based on the hop-count.

When operating as a network node (e.g., a child network node or access device, or a first network node in an IAB system), the hop-count manager 1010 may receive a signal from a relay network node in the wireless communications system, the signal indicative of a hop-count between the relay network node and a second network node in the wireless communications system, determine the hop-count between the relay network node and the second network node based on the received signal, and communicate with the relay network node or a child network node based on the hop-count. The hop-count manager 1010 may receive a signal from a relay network node in the wireless communications system, the signal indicative of a hop-count between the relay network node and a second network node in the wireless communications system, determine a set of time-frequency resources for communication with the relay network node or a child network node based on the hop-count, and communicate with the relay network node or the child network node based on the set of time-frequency resources. Additionally or alternatively, the hop-count manager 1010 may receive a signal from a relay network node in the wireless communications system, the signal indicative of a first hop-count associated with a first communication path and a first QoS or a second hop-count associated with a second communication path and a second QoS, and communicate with the relay network node or a child network node via the first communication path or the second communication path based on the signal.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM), read only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting hop-count indication in wireless systems, functions or tasks supporting the selection of time-frequency resources in wireless systems based on hop-count, functions or tasks supporting determining a resource configuration in wireless systems).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
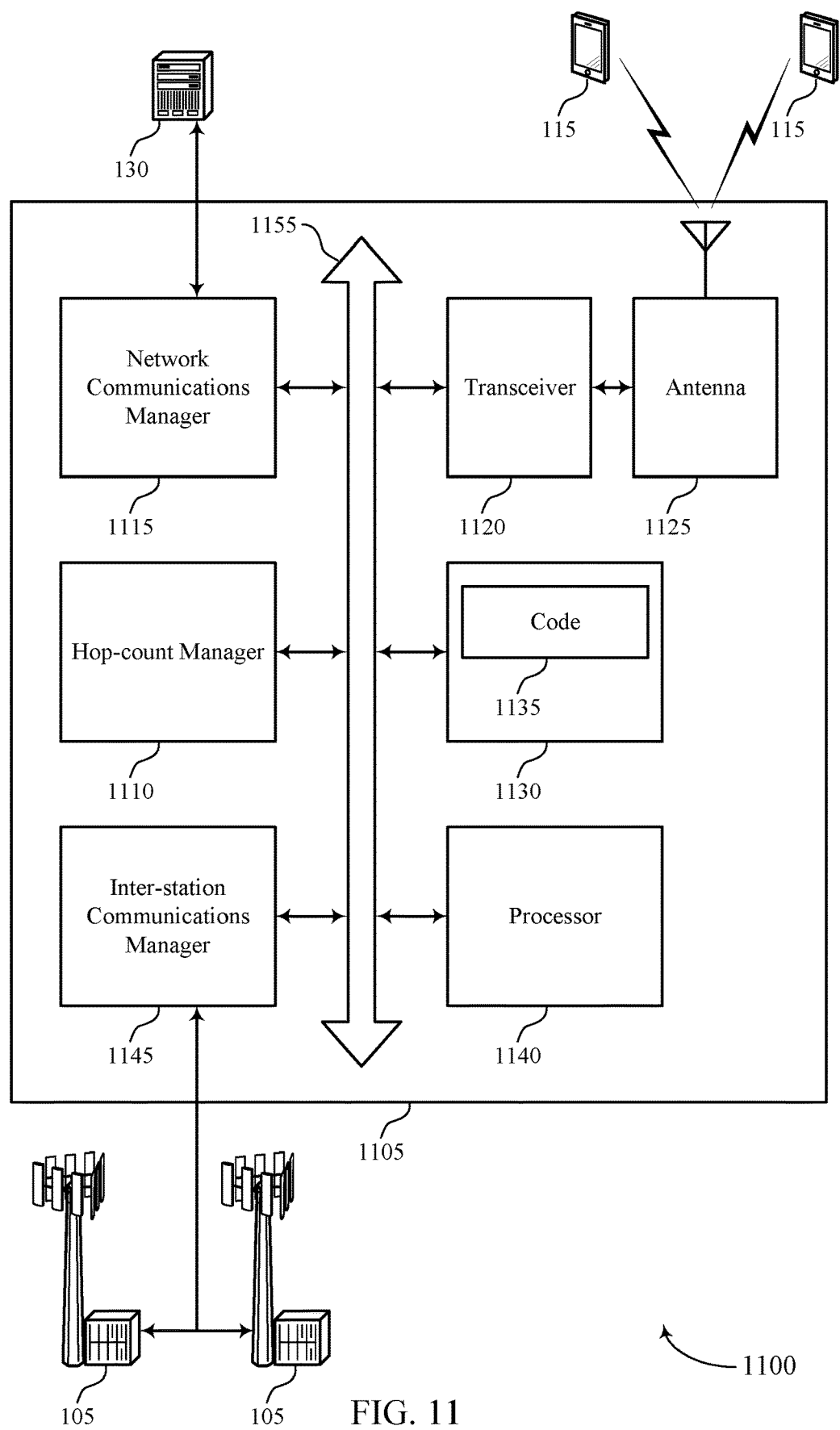
FIG. 11 shows a diagram of a system including a base station that supports hop-count indication in wireless systems in accordance with aspects of the present disclosure.

FIG. 11 shows a diagram of a system 1100 including a device 1105 that supports hop-count indication in wireless systems in accordance with aspects of the present disclosure. The device 1105 may be an example of or include the components of device 705, device 805, or a base station 105 as described herein. The device 1105 may include components for bi-directional voice and data communications including components for transmitting and receiving communications, including a hop-count manager 1110, a network communications manager 1115, a transceiver 1120, an antenna 1125, memory 1130, a processor 1140, and an inter-station communications manager 1145. These components may be in electronic communication via one or more buses (e.g., bus 1155).

When operating as a relay network node, the hop-count manager 1110 may identify a hop-count between the relay network node and a network node in the wireless communications system, select a set of time-frequency resources for transmission of a signal to a second network node in the wireless communications system, generate the signal based on a generation sequence, where the signal conveys an indication of the hop-count and the indication of the hop-count is based on the set of time-frequency resources or the generation sequence, and transmit the signal over the set of time-frequency resources to the second network node. Additionally or alternatively, the hop-count manager 1110 may identify a hop-count between the relay network node and a network node in the wireless communications system, select, based on the hop count, a set of time-frequency resources for transmission of a signal to a second network node in the wireless communications system, and transmit the signal over the set of time-frequency resources to the second network node. Additionally or alternatively, the hop-count manager 1110 may receive a resource configuration from a control node, and select a set of time-frequency resources based on the resource configuration.

When operating as a control node (e.g., a control node in an IAB system), the hop-count manager 1110 may identify a hop-count between a relay network node and a network node in the wireless communications system, select, based on the hop count, a set of time-frequency resources for transmission of a signal to a second network node in the wireless communications system, and transmit a resource configuration associated with the set of time-frequency resources to the second network node.

When operating as a control node (e.g., a control node in an IAB system), the hop-count manager 1110 may determine a resource configuration for a relay network node in the wireless communications system, where the resource configuration is associated with a set of time-frequency resources selectable, based on a hop-count between the relay network node and a network node in the wireless communications system, for communication with the network node, and transmit the resource configuration to the relay network node. The hop-count manager 1110 may identify the hop-count between the relay network node and the network node, and select the set of time-frequency resources based on the hop-count. The resource configuration may be associated with multiple sets of time-frequency resources, and one or more of the multiple sets may be selectable by the relay network node based on the hop-count.

When operating as a child network node or an access device, the hop-count manager 1110 may also receive a signal from a relay network node in the wireless communications system, determine a hop-count between the relay network node and a second network node in the wireless communications system based on the received signal, and communicate with the relay network node based on the hop-count.

When operating as a relay network node, the hop-count manager 1110 may also identify a first communication path from the relay network node to a first anchor network node of the wireless communications system, where the first communication path is associated with a first hop-count and a first QoS, identify a second communication path from the relay network node to a second anchor network node of the wireless communications system, where the second communication path is associated with a second hop-count and a second QoS, and indicate at least one of the first hop-count or the second hop-count to a child network node or an access device in communication with the relay network node. Additionally or alternatively, the hop-count manager 1110 may identify a first communication path from the relay network node to a first anchor network node of the wireless communications system, where the first communication path is associated with a first hop-count and a first QoS, identify a second communication path from the relay network node to a second anchor network node of the wireless communications system, where the second communication path is associated with a second hop-count and a second QoS, and transmit a signal to a child network node or an access device in communication with the relay network node, where the signal conveys an indication of at least one of the first hop-count or the second hop-count.

When operating as a network node (e.g., a child network node or access device, or a first network node in an IAB system), the hop-count manager 1110 may receive a signal from a relay network node in the wireless communications system, the signal indicative of a hop-count between the relay network node and a second network node in the wireless communications system, determine the hop-count between the relay network node and the second network node based on the received signal, and communicate with the relay network node or a child network node based on the hop-count. The hop-count manager 1110 may receive a signal from a relay network node in the wireless communications system, the signal indicative of a hop-count between the relay network node and a second network node in the wireless communications system, determine a set of time-frequency resources for communication with the relay network node or a child network node based on the hop-count, and communicate with the relay network node or the child network node based on the set of time-frequency resources. Additionally or alternatively, the hop-count manager 1110 may receive a signal from a relay network node in the wireless communications system, the signal indicative of a first hop-count associated with a first communication path and a first QoS or a second hop-count associated with a second communication path and a second QoS, and communicate with the relay network node or a child network node via the first communication path or the second communication path based on the signal.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting hop-count indication in wireless systems, functions or tasks supporting the selection of time-frequency resources in wireless systems based on hop-count, functions or tasks supporting determining a resource configuration in wireless systems).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
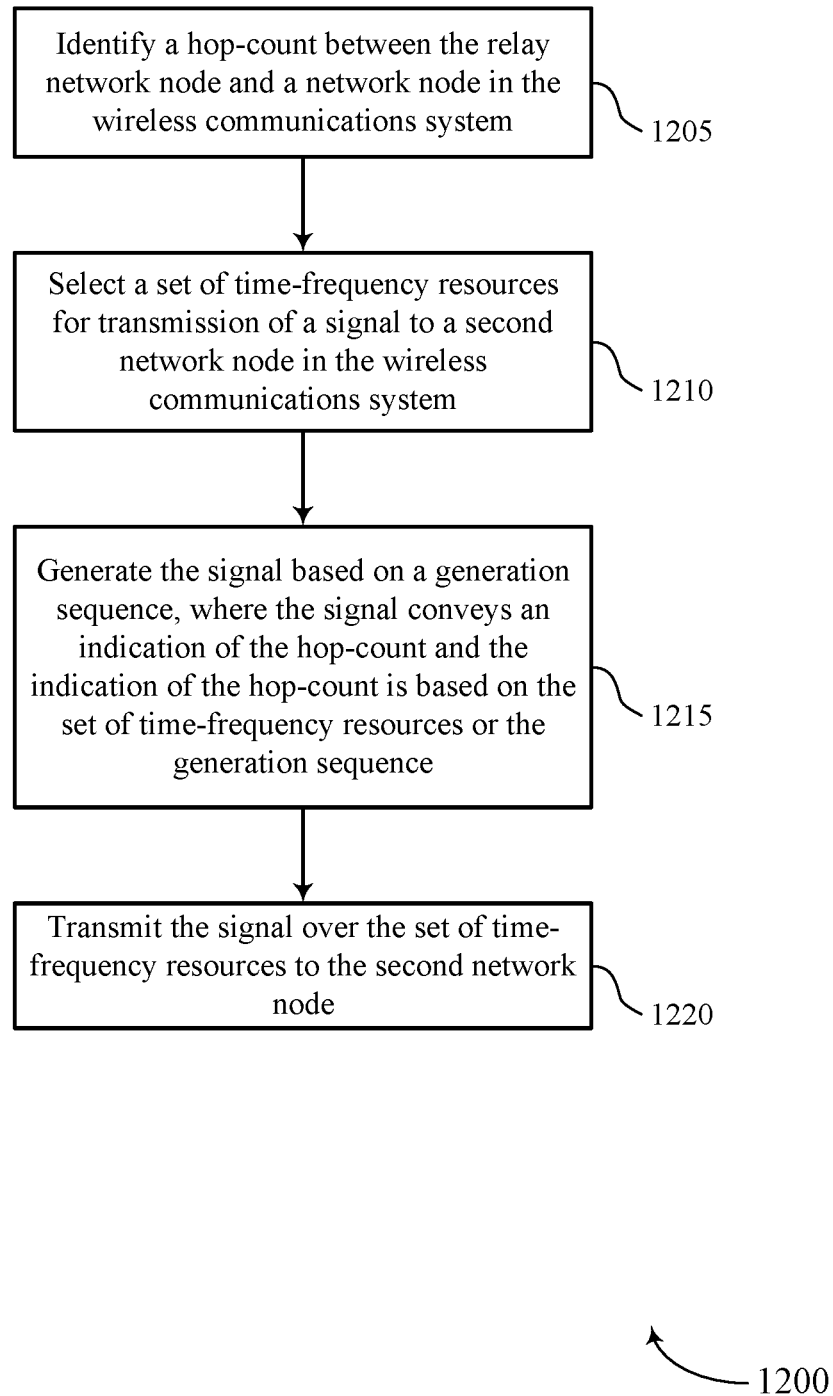
FIGS. 12 through 20 show flowcharts illustrating methods that support hop-count indication in wireless systems in accordance with aspects of the present disclosure.

FIG. 12 shows a flowchart illustrating a method 1200 that supports hop-count indication in wireless systems in accordance with aspects of the present disclosure. The operations of method 1200 may be implemented by a relay network node (e.g., a UE 115 or base station 105) or its components as described herein. For example, the operations of method 1200 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1205, the relay network node may identify a hop-count between the relay network node and a network node in the wireless communications system. The operations of 1205 may be performed according to the methods described herein. In some examples, aspects of the operations of 1205 may be performed by a hop-count identifier as described with reference to FIGS. 7 through 11.

At 1210, the relay network node may select a set of time-frequency resources for transmission of a signal to a second network node in the wireless communications system. The relay network node may select the set of time-frequency resources, for example, based on the hop-count. The operations of 1210 may be performed according to the methods described herein. In some examples, aspects of the operations of 1210 may be performed by a resource manager as described with reference to FIGS. 7 through 11.

At 1215, the relay network node may generate the signal based on a generation sequence, where the signal conveys an indication of the hop-count and the indication of the hop-count is based on the set of time-frequency resources or the generation sequence. The operations of 1215 may be performed according to the methods described herein. In some examples, aspects of the operations of 1215 may be performed by a signal generator as described with reference to FIGS. 7 through 11.

At 1220, the relay network node may transmit the signal over the set of time-frequency resources to the second network node. The operations of 1220 may be performed according to the methods described herein. In some examples, aspects of the operations of 1220 may be performed by a transmission component as described with reference to FIGS. 7 through 11.

Figure 13:
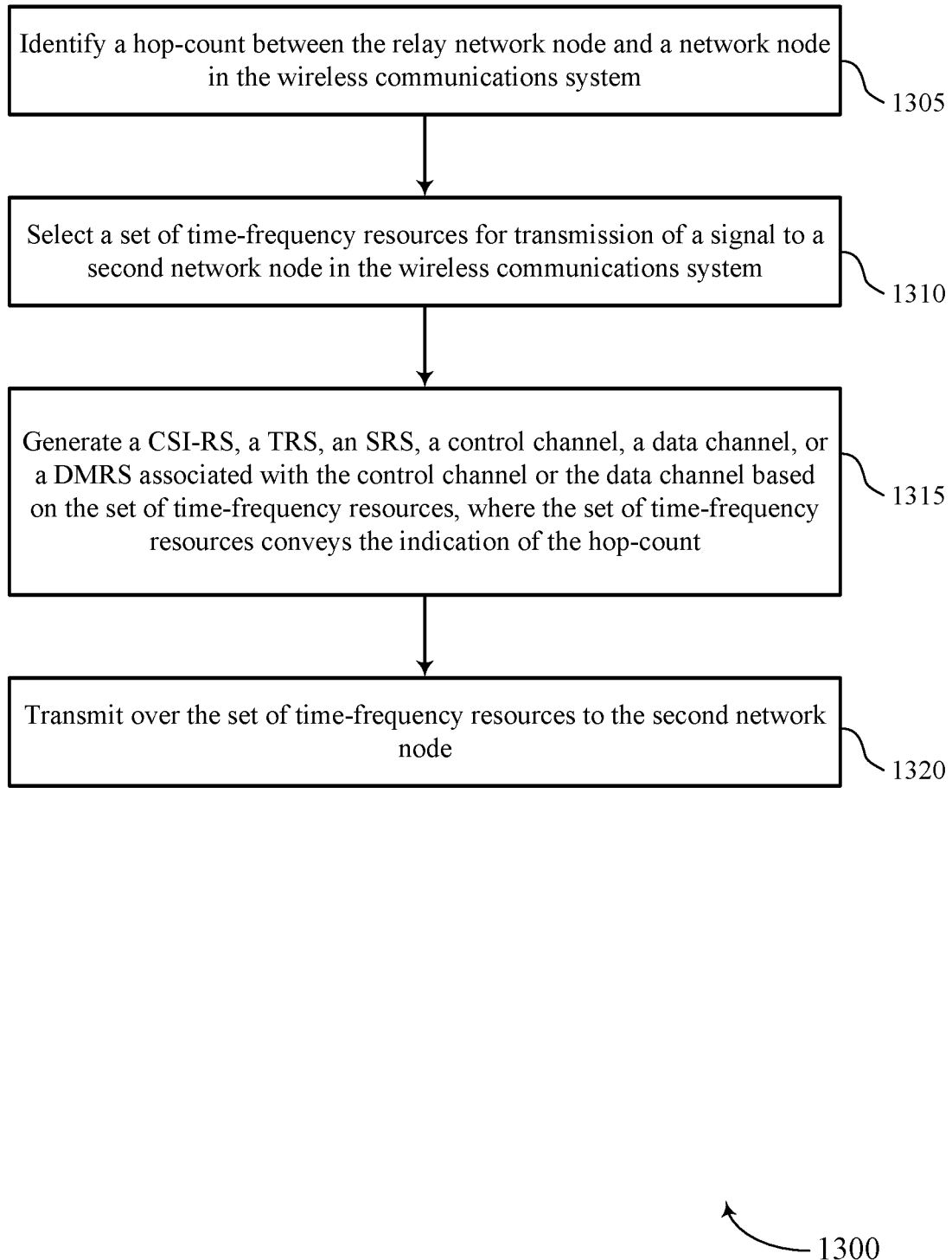

FIG. 13 shows a flowchart illustrating a method 1300 that supports hop-count indication in wireless systems in accordance with aspects of the present disclosure. The operations of method 1300 may be implemented by a relay network node (e.g., a UE 115 or base station 105) or its components as described herein. For example, the operations of method 1300 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1305, the relay network node may identify a hop-count between the relay network node and a network node in the wireless communications system. The operations of 1305 may be performed according to the methods described herein. In some examples, aspects of the operations of 1305 may be performed by a hop-count identifier as described with reference to FIGS. 7 through 11.

At 1310, the relay network node may select a set of time-frequency resources for transmission of a signal to a second network node in the wireless communications system. The relay network node may select the set of time-frequency resources, for example, based on the hop-count. The operations of 1310 may be performed according to the methods described herein. In some examples, aspects of the operations of 1310 may be performed by a resource manager as described with reference to FIGS. 7 through 11.

At 1315, the relay network node may generate a CSI-RS, a TRS, an SRS, a control channel, a data channel, or a DMRS associated with the control channel or the data channel based on the set of time-frequency resources, where the set of time-frequency resources conveys the indication of the hop-count. The operations of 1315 may be performed according to the methods described herein. In some examples, aspects of the operations of 1315 may be performed by a signal generator as described with reference to FIGS. 7 through 11.

At 1320, the relay network node may transmit the signal generated at 1315 over the set of time-frequency resources to the second network node. The operations of 1320 may be performed according to the methods described herein. In some examples, aspects of the operations of 1320 may be performed by a transmission component as described with reference to FIGS. 7 through 11.

Figure 14:
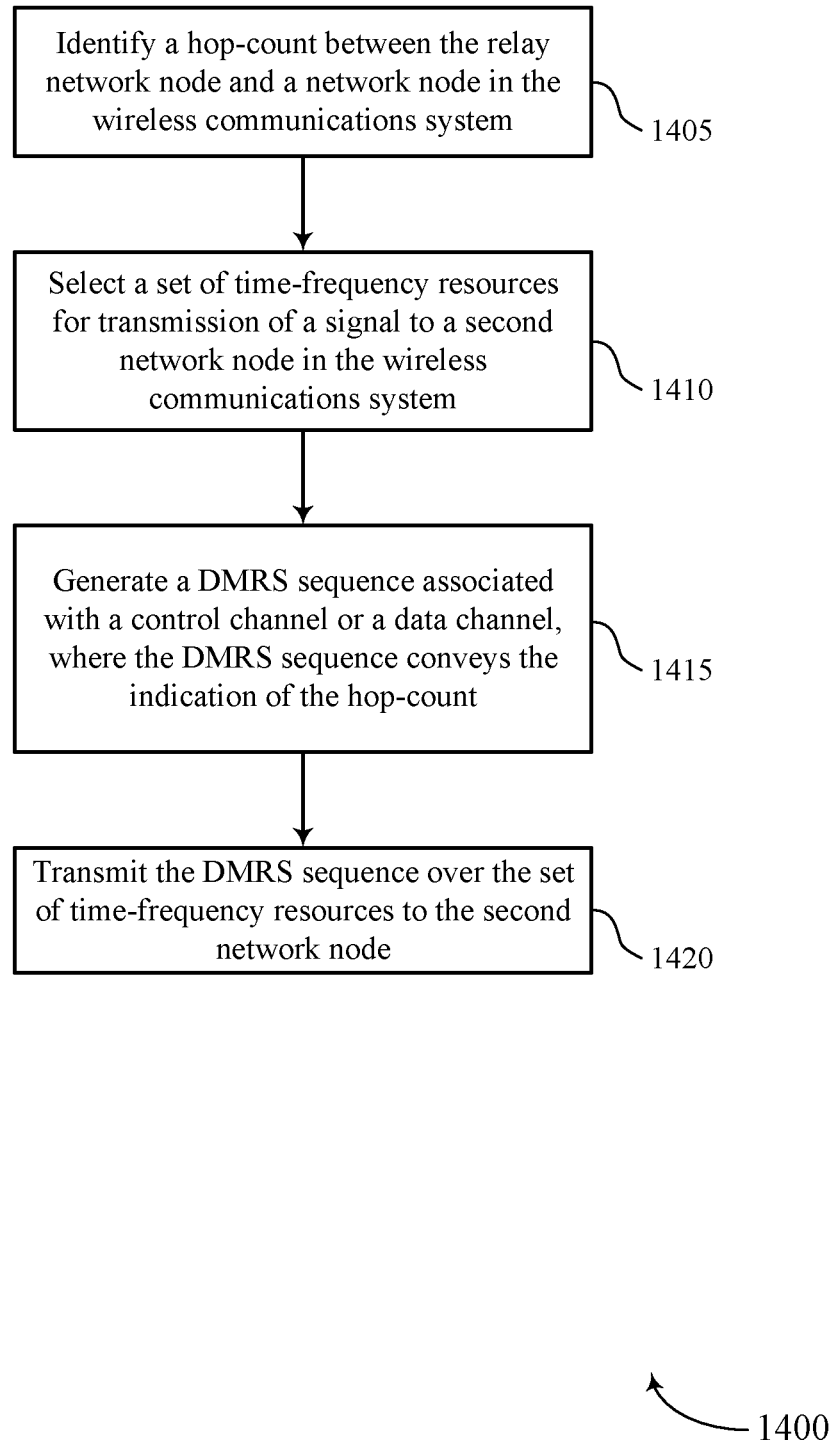

FIG. 14 shows a flowchart illustrating a method 1400 that supports hop-count indication in wireless systems in accordance with aspects of the present disclosure. The operations of method 1400 may be implemented by a relay network node (e.g., a UE 115 or base station 105) or its components as described herein. For example, the operations of method 1400 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1405, the relay network node may identify a hop-count between the relay network node and a network node in the wireless communications system. The operations of 1405 may be performed according to the methods described herein. In some examples, aspects of the operations of 1405 may be performed by a hop-count identifier as described with reference to FIGS. 7 through 11.

At 1410, the relay network node may select a set of time-frequency resources for transmission of a signal to a second network node in the wireless communications system. The relay network node may select the set of time-frequency resources, for example, based on the hop-count.

The operations of 1410 may be performed according to the methods described herein. In some examples, aspects of the operations of 1410 may be performed by a resource manager as described with reference to FIGS. 7 through 11.

At 1415, the relay network node may generate a DMRS sequence associated with a control channel or a data channel, where the DMRS sequence conveys the indication of the hop-count. The operations of 1415 may be performed according to the methods described herein. In some examples, aspects of the operations of 1415 may be performed by a signal generator as described with reference to FIGS. 7 through 11.

At 1420, the relay network node may transmit the DMRS sequence over the set of time-frequency resources to the second network node. The operations of 1420 may be performed according to the methods described herein. In some examples, aspects of the operations of 1420 may be performed by a transmission component as described with reference to FIGS. 7 through 11.

Figure 15:
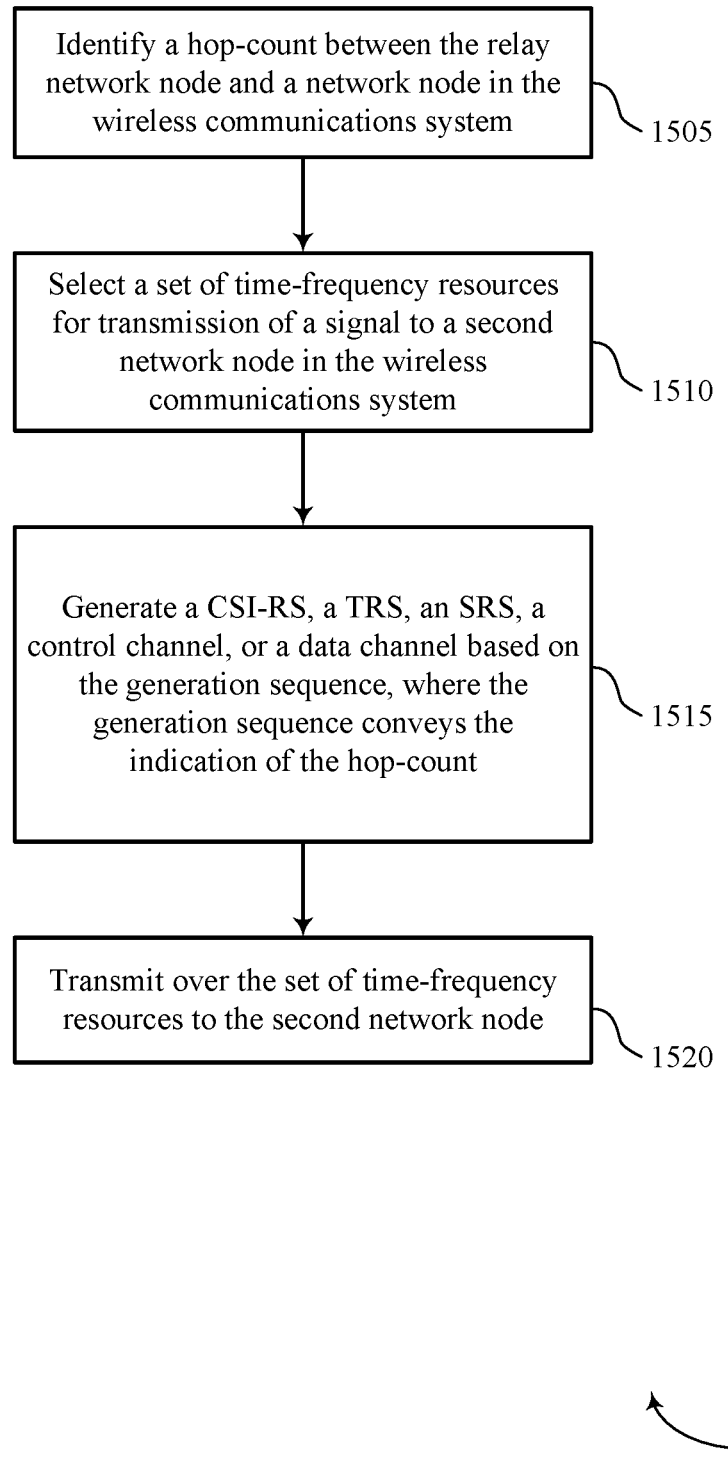

FIG. 15 shows a flowchart illustrating a method 1500 that supports hop-count indication in wireless systems in accordance with aspects of the present disclosure. The operations of method 1500 may be implemented by a relay network node (e.g., a UE 115 or base station 105) or its components as described herein. For example, the operations of method 1500 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1505, the relay network node may identify a hop-count between the relay network node and a network node in the wireless communications system. The operations of 1505 may be performed according to the methods described herein. In some examples, aspects of the operations of 1505 may be performed by a hop-count identifier as described with reference to FIGS. 7 through 11.

At 1510, the relay network node may select a set of time-frequency resources for transmission of a signal to a second network node in the wireless communications system. The relay network node may select the set of time-frequency resources, for example, based on the hop-count. The operations of 1510 may be performed according to the methods described herein. In some examples, aspects of the operations of 1510 may be performed by a resource manager as described with reference to FIGS. 7 through 11.

At 1515, the relay network node may generate a CSI-RS, a TRS, an SRS, a control channel, or a data channel based on the generation sequence, where the generation sequence conveys the indication of the hop-count. The operations of 1515 may be performed according to the methods described herein. In some examples, aspects of the operations of 1515 may be performed by a signal generator as described with reference to FIGS. 7 through 11.

At 1520, the relay network node may transmit the signal generated at 1515 over the set of time-frequency resources to the second network node. The operations of 1520 may be performed according to the methods described herein. In some examples, aspects of the operations of 1520 may be performed by a transmission component as described with reference to FIGS. 7 through 11.

Figure 16:
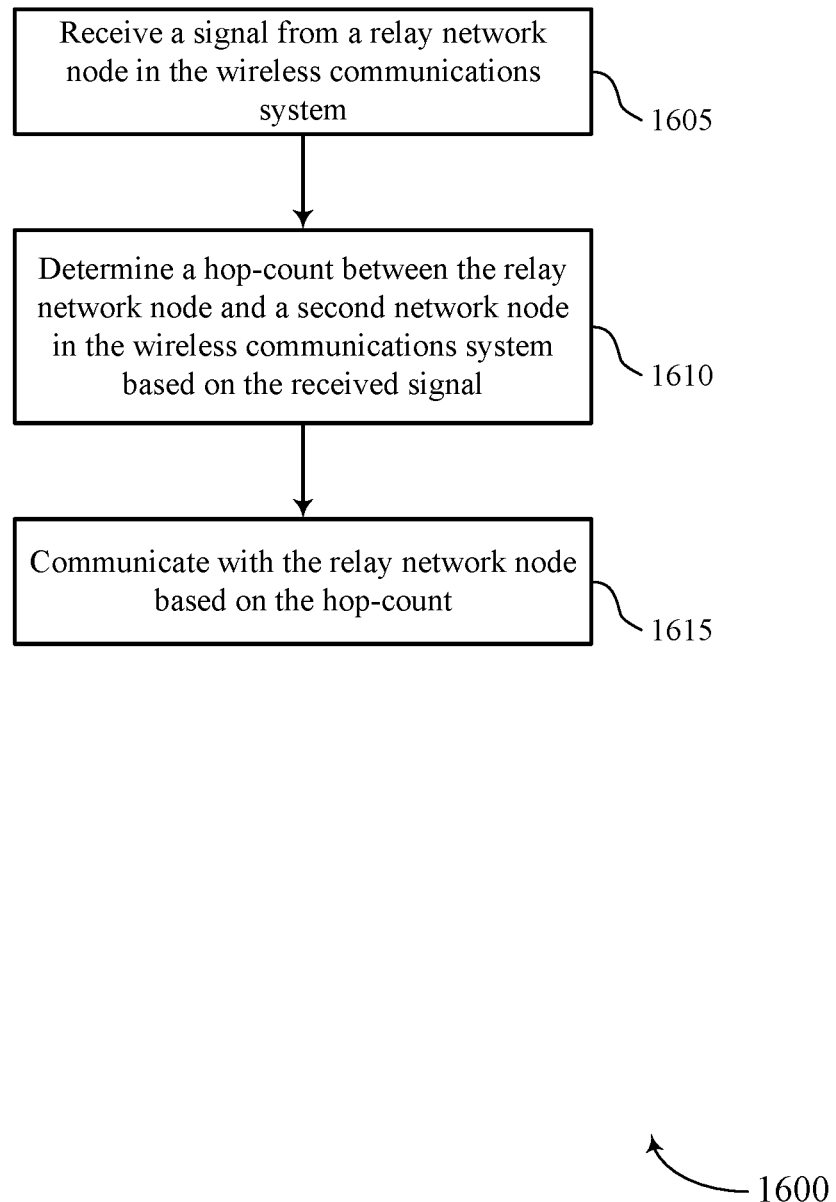

FIG. 16 shows a flowchart illustrating a method 1600 that supports hop-count indication in wireless systems in accordance with aspects of the present disclosure. The operations of method 1600 may be implemented by child network node (e.g., a base station 105) or an access device (e.g., a UE 115) or their components as described herein. For example, the operations of method 1600 may be performed by a hop-count manager as described with reference to FIGS. 7 through 11. In some examples, a child network node or access device may execute a set of instructions to control the functional elements of the child network node or access device to perform the functions described herein. Additionally or alternatively, a child network node or access device may perform aspects of the functions described herein using special-purpose hardware.

At 1605, the child network node or access device may receive a signal from a relay network node in the wireless communications system. The signal may be indicative of a hop-count (e.g., a hop-count between the relay network node and a second network node in the wireless communications system). The operations of 1605 may be performed according to the methods described herein. In some examples, aspects of the operations of 1605 may be performed by a reception component as described with reference to FIGS. 7 through 11.

At 1610, the child network node or access device may determine a hop-count between the relay network node and a second network node in the wireless communications system based on the received signal. The operations of 1610 may be performed according to the methods described herein. In some examples, aspects of the operations of 1610 may be performed by a hop-count identifier as described with reference to FIGS. 7 through 11.

At 1615, the child network node or access device may communicate with the relay network node or another child network node based on the hop-count. The operations of 1615 may be performed according to the methods described herein. In some examples, aspects of the operations of 1615 may be performed by a communication component as described with reference to FIGS. 7 through 11.

Figure 17:
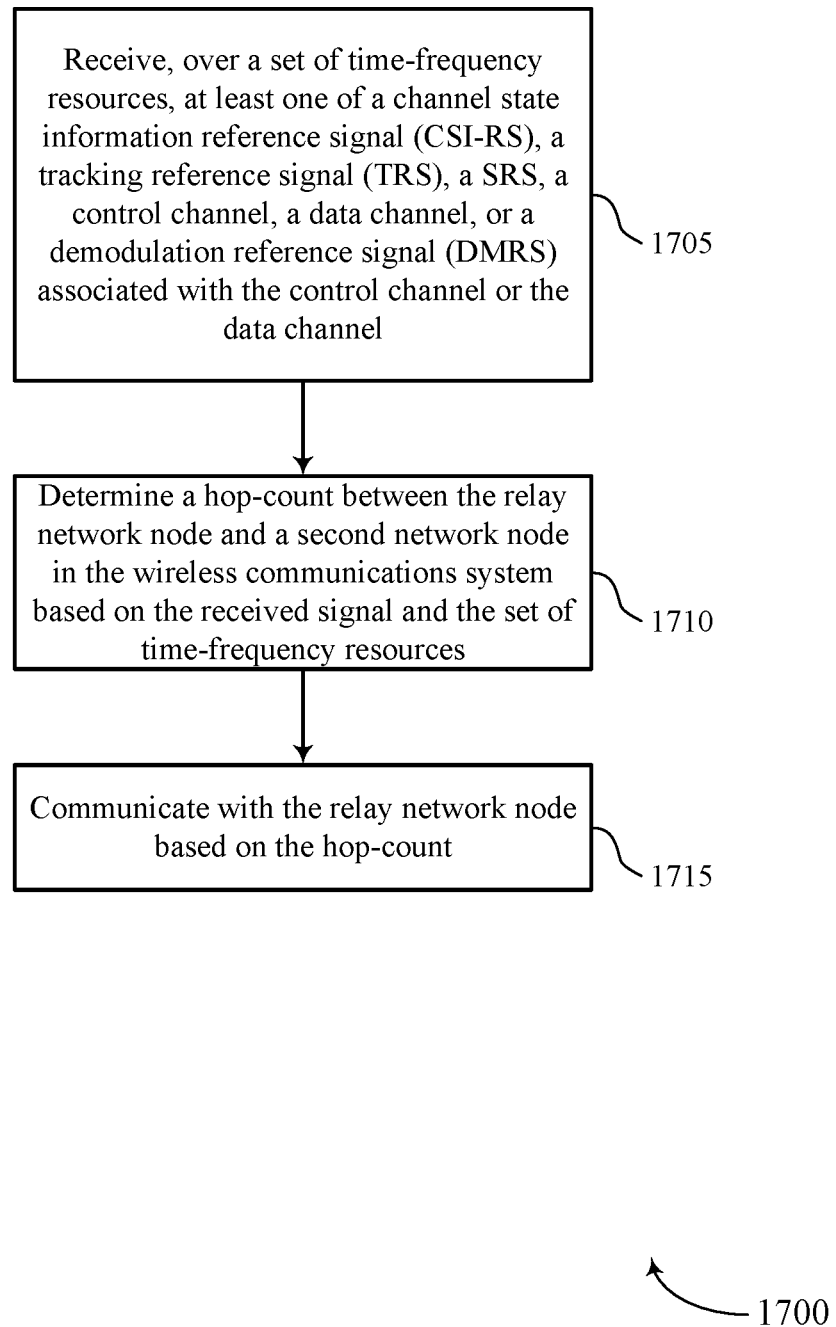

FIG. 17 shows a flowchart illustrating a method 1700 that supports hop-count indication in wireless systems in accordance with aspects of the present disclosure. The operations of method 1700 may be implemented by a relay network node (e.g., a UE 115 or base station 105) or its components as described herein. For example, the operations of method 1700 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1705, the relay network node may receive, over a set of time-frequency resources, at least one of a CSI-RS, a TRS, an SRS, a control channel, a data channel, or a DMRS associated with the control channel or the data channel. The operations of 1705 may be performed according to the methods described herein. In some examples, aspects of the operations of 1705 may be performed by a reception component as described with reference to FIGS. 7 through 11.

At 1710, the relay network node may determine a hop-count between the relay network node and a second network node in the wireless communications system based on the received signal and the set of time-frequency resources. The operations of 1710 may be performed according to the methods described herein. In some examples, aspects of the operations of 1710 may be performed by a hop-count identifier as described with reference to FIGS. 7 through 11.

At 1715, the relay network node may communicate with the relay network node or a child network node based on the hop-count. The operations of 1715 may be performed according to the methods described herein. In some examples, aspects of the operations of 1715 may be performed by a communication component as described with reference to FIGS. 7 through 11.

Figure 18:
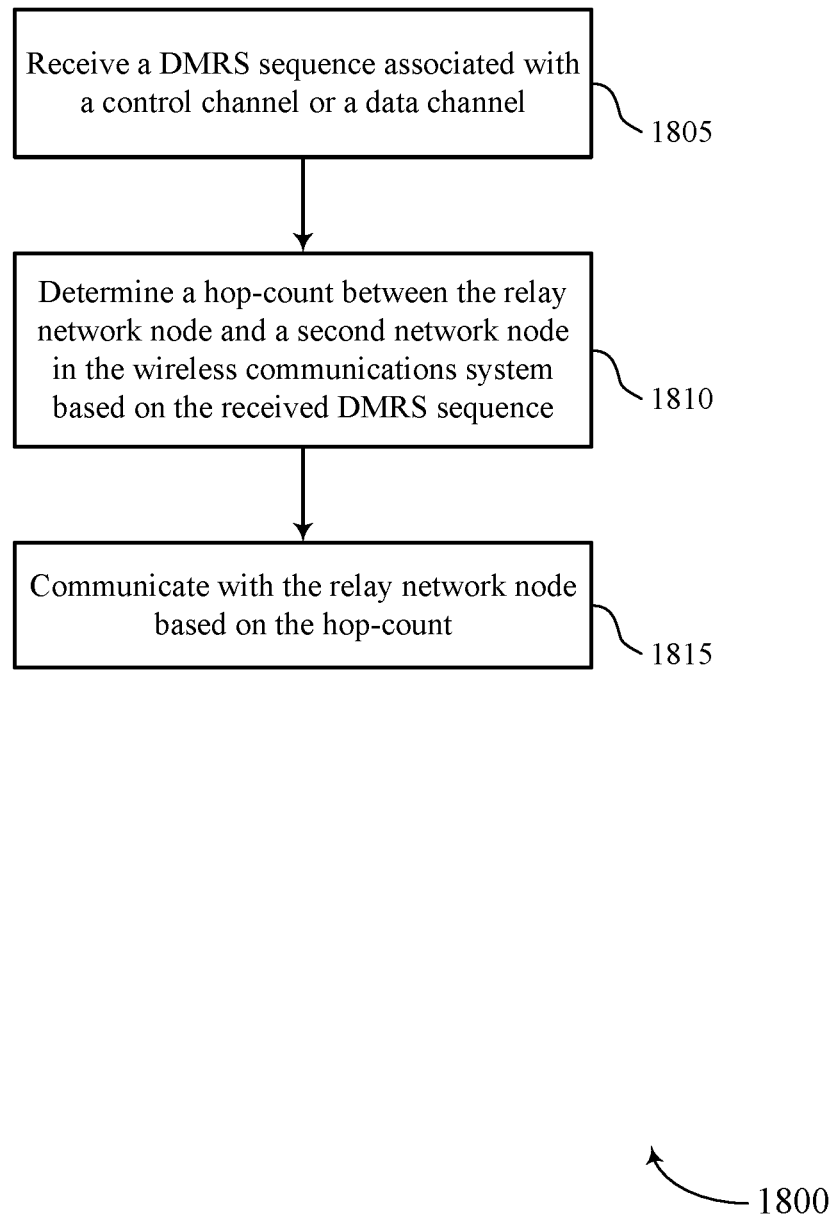

FIG. 18 shows a flowchart illustrating a method 1800 that supports hop-count indication in wireless systems in accordance with aspects of the present disclosure. The operations of method 1800 may be implemented by a relay network node (e.g., a UE 115 or base station 105) or its components as described herein. For example, the operations of method 1800 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1805, the relay network node may receive a DMRS sequence associated with a control channel or a data channel. The operations of 1805 may be performed according to the methods described herein. In some examples, aspects of the operations of 1805 may be performed by a reception component as described with reference to FIGS. 7 through 11.

At 1810, the relay network node may determine a hop-count between the relay network node and a second network node in the wireless communications system based on the received DMRS sequence. The operations of 1810 may be performed according to the methods described herein. In some examples, aspects of the operations of 1810 may be performed by a hop-count identifier as described with reference to FIGS. 7 through 11.

At 1815, the relay network node may communicate with the relay network node or a child network node based on the hop-count. The operations of 1815 may be performed according to the methods described herein. In some examples, aspects of the operations of 1815 may be performed by a communication component as described with reference to FIGS. 7 through 11.

Figure 19:
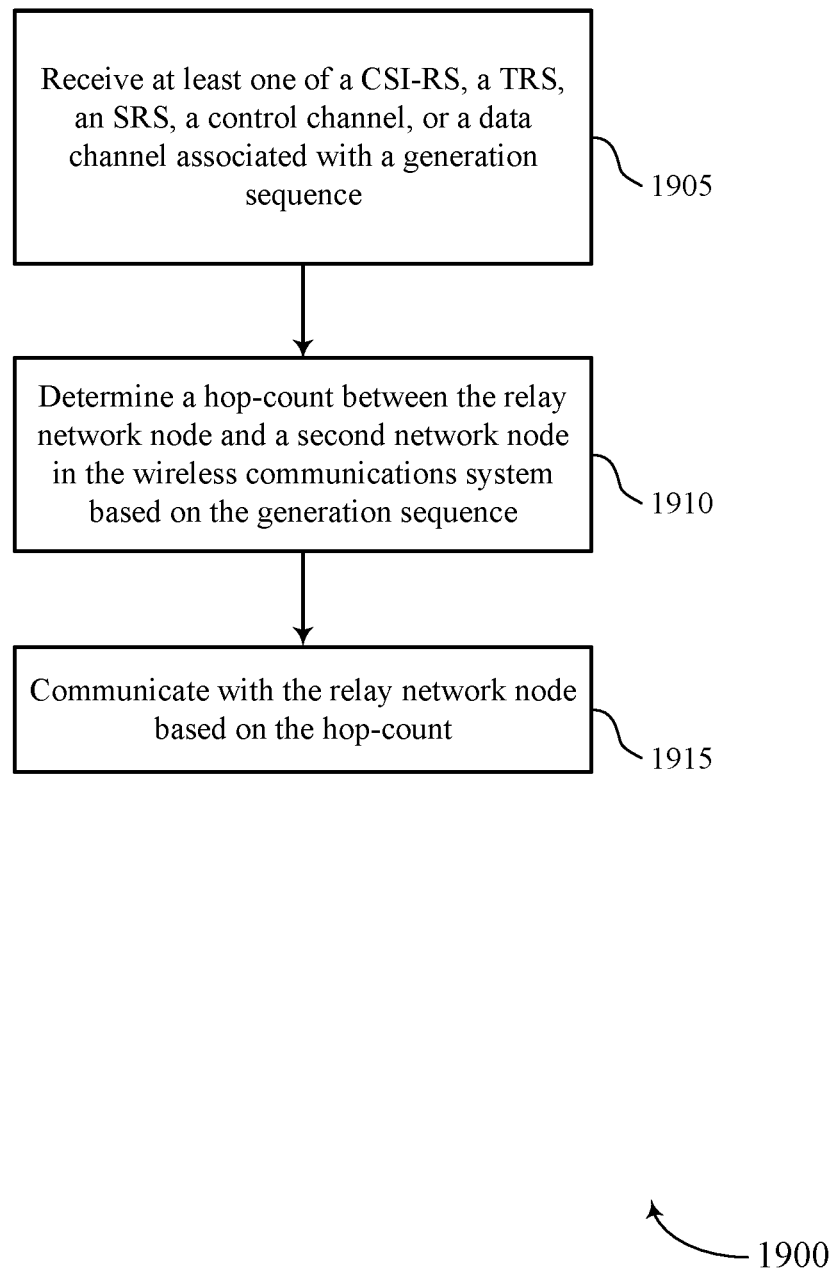

FIG. 19 shows a flowchart illustrating a method 1900 that supports hop-count indication in wireless systems in accordance with aspects of the present disclosure. The operations of method 1900 may be implemented by a relay network node (e.g., a UE 115 or base station 105) or its components as described herein. For example, the operations of method 1900 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 1905, the relay network node may receive at least one of a CSI-RS, a TRS, an SRS, a control channel, or a data channel associated with a generation sequence. The operations of 1905 may be performed according to the methods described herein. In some examples, aspects of the operations of 1905 may be performed by a reception component as described with reference to FIGS. 7 through 11.

At 1910, the relay network node may determine a hop-count between the relay network node and a second network node in the wireless communications system based on the generation sequence. The operations of 1910 may be performed according to the methods described herein. In some examples, aspects of the operations of 1910 may be performed by a hop-count identifier as described with reference to FIGS. 7 through 11.

At 1915, the relay network node may communicate with the relay network node based on the hop-count. The operations of 1915 may be performed according to the methods described herein. In some examples, aspects of the operations of 1915 may be performed by a communication component as described with reference to FIGS. 7 through 11.

Figure 20:
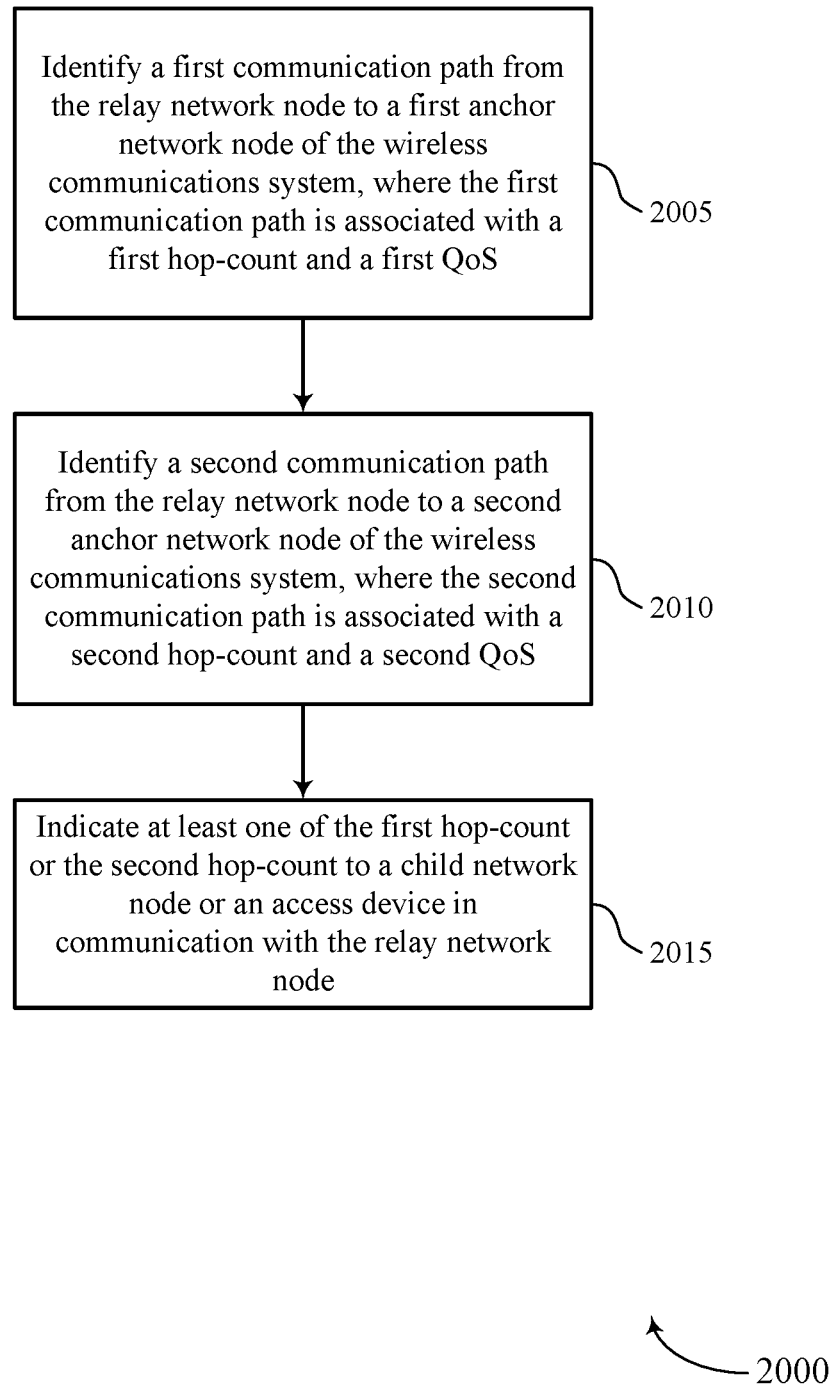

FIG. 20 shows a flowchart illustrating a method 2000 that supports hop-count indication in wireless systems in accordance with aspects of the present disclosure. The operations of method 2000 may be implemented by a relay network node (e.g., UE 115 or base station 105) or its components as described herein. For example, the operations of method 2000 may be performed by a hop-count manager as described with reference to FIGS. 7 through 11. In some examples, a relay network node may execute a set of instructions to control the functional elements of the relay network node to perform the functions described herein. Additionally or alternatively, a relay network node may perform aspects of the functions described herein using special-purpose hardware.

At 2005, the relay network node may identify a first communication path from the relay network node to a first anchor network node of the wireless communications system, where the first communication path is associated with a first hop-count and a first QoS. The operations of 2005 may be performed according to the methods described herein. In some examples, aspects of the operations of 2005 may be performed by a communication path manager as described with reference to FIGS. 7 through 11.

At 2010, the relay network node may identify a second communication path from the relay network node to a second anchor network node of the wireless communications system, where the second communication path is associated with a second hop-count and a second QoS. The operations of 2010 may be performed according to the methods described herein. In some examples, aspects of the operations of 2010 may be performed by a communication path manager as described with reference to FIGS. 7 through 11.

At 2015, the relay network node may indicate at least one of the first hop-count or the second hop-count to a child network node or an access device in communication with the relay network node. At 2015, the relay network node may transmit a signal to a child network node or an access device in communication with the relay network node, where the signal conveys an indication of at least one of the first hop-count or the second hop-count. The operations of 2015 may be performed according to the methods described herein. In some examples, aspects of the operations of 2015 may be performed by an indication component as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a relay network node in a wireless communications system, comprising:
    identifying a hop-count between the relay network node and a network node in the wireless communications system;
    determining that one or more nodes of the wireless communications system share a cell identifier (ID) with the relay network node;
    generating a second ID based at least in part on the cell ID and the hop-count;
    selecting a set of time-frequency resources associated with the hop-count for transmission of a signal to a second network node in the wireless communications system; and
    transmitting the signal over the set of time-frequency resources to the second network node, wherein the second ID is used as a generation sequence for generating the signal.

2. The method of claim 1, further comprising:
    generating a channel state information reference signal (CSI-RS), a tracking reference signal (TRS), a sounding reference signal (SRS), a control channel, a data channel, or a demodulation reference signal (DMRS) associated with the control channel or the data channel based at least in part on the set of time-frequency resources, wherein the set of time-frequency resources indicates the hop-count.

3. The method of claim 1, further comprising:
    generating a demodulation reference signal (DMRS) sequence associated with a control channel or a data channel, wherein the DMRS sequence indicates the hop-count.

4. The method of claim 1, further comprising:
    generating a channel state information reference signal (CSI-RS), a tracking reference signal (TRS), a sounding reference signal (SRS), a control channel, or a data channel based at least in part on a generation sequence, wherein the generation sequence indicates the hop-count.

5. The method of claim 4, wherein the generation sequence is a scrambling sequence or a base sequence.

6. The method of claim 1, wherein the second ID is generated based at least in part on a sibling count or a random value.

7. The method of claim 1, further comprising:
    determining, based at least in part on the hop-count, a resource pattern or a slot structure for the relay network node, downlink resources for the relay network node, uplink resources for the relay network node, a parent network node in communication with the relay network node, a child network node in communication with the relay network node, an access device in communication with the relay network node, or any combination thereof, wherein the slot structure comprises an indication of one or more downlink symbols, uplink symbols, and flexible symbols within a slot.

8. The method of claim 7, wherein the resource pattern or the slot structure is determined based at least in part on a mapping rule.

9. The method of claim 7, wherein the resource pattern or the slot structure is associated with a semi-static resource allocation.

10. The method of claim 1, further comprising:
    transmitting a second signal different from the signal based at least in part on the hop-count.

11. The method of claim 10, wherein the second signal comprises a system information block (SIB).

12. The method of claim 1, further comprising:
    receiving a resource configuration from a control node; and
    selecting the set of time-frequency resources based at least in part on the resource configuration.

13. A method for wireless communications at a first network node in a wireless communications system, comprising:
    receiving a signal from a relay network node in the wireless communications system, the signal indicative of a hop-count between the relay network node and a second network node in the wireless communications system, wherein the signal is based at least in part on a generation sequence, the generation sequence based at least in part on a shared cell identifier (ID), a second ID of the relay network node, and the hop-count;
    determining a set of time-frequency resources associated with the hop-count for communication with the relay network node or a child network node; and
    communicating with the relay network node or the child network node based at least in part on the set of time-frequency resources.

14. The method of claim 13, further comprising:
    receiving, over the set of time-frequency resources, at least one of a channel state information reference signal (CSI-RS), a tracking reference signal (TRS), a sounding reference signal (SRS), a control channel, a data channel, or a demodulation reference signal (DMRS) associated with the control channel or the data channel; and communicating with the relay network node or the child network node based at least in part on one or more of the CSI-RS, the TRS, the SRS, the control channel, the data channel, or the DMRS.

15. The method of claim 14, wherein the set of time-frequency resources indicates the hop-count.

16. The method of claim 13, further comprising:
receiving a demodulation reference signal (DMRS) sequence associated with a control channel or a data channel; and communicating with the relay network node or the child network node based at least in part on the DMRS sequence.

17. The method of claim 16, wherein the DMRS sequence indicates the hop-count.

18. The method of claim 13, further comprising:
receiving at least one of a channel state information reference signal (CSI-RS), a tracking reference signal (TRS), a sounding reference signal (SRS), a control channel, or a data channel associated with a generation sequence; and communicating with the relay network node or the child network node based at least in part on the generation sequence.

19. The method of claim 18, wherein:
the generation sequence comprises a scrambling sequence or a base sequence; and
the generation sequence indicates the hop-count.

20. The method of claim 13, further comprising:
determining a resource pattern or a slot structure for communication with the relay network node based at least in part on the hop-count, wherein the resource pattern or the slot structure is determined based at least in part on a mapping rule.

21. The method of claim 20, further comprising:
communicating with the relay network node based at least in part on the resource pattern, the slot structure, or a combination thereof.

22. The method of claim 13, wherein:
the signal is a broadcast signal; and
the set of time-frequency resources is associated with the signal or a periodicity of the signal.

23. The method of claim 13, wherein receiving the signal comprises:
receiving a common channel carrying information related to multiple hop-counts; and
communicating with the relay network node or the child network node based at least in part on the common channel.

24. An apparatus for wireless communications at a relay network node in a wireless communications system, comprising:
a processor,
memory coupled with the processor; and
instructions stored in the memory and executable by the processor to cause the apparatus to:
identify a hop-count between the relay network node and a network node in the wireless communications system;
determine that one or more nodes of the wireless communications system share a cell identifier (ID) with the relay network node;
generate a second ID based at least in part on the cell ID and the hop-count:
select a set of time-frequency resources associated with the hop-count for transmission of a signal to a second network node in the wireless communications system; and
transmit the signal over the set of time-frequency resources to the second network node, wherein the second ID is used as a generation sequence to generate the signal.

25. The apparatus of claim 24, wherein the instructions are further executable by the processor to cause the apparatus to:
generate a channel state information reference signal (CSI-RS), a tracking reference signal (TRS), a sounding reference signal (SRS), a control channel, a data channel, or a demodulation reference signal (DMRS) associated with the control channel or the data channel based at least in part on the set of time-frequency resources, wherein the set of time-frequency resources indicates the hop-count.

26. The apparatus of claim 24, wherein the instructions are further executable by the processor to cause the apparatus to:
generate a demodulation reference signal (DMRS) sequence associated with a control channel or a data channel, wherein the DMRS sequence indicates the hop-count.

* * * * *